US007360215B2

(12) United States Patent
Kraiss et al.

(10) Patent No.: US 7,360,215 B2
(45) Date of Patent: Apr. 15, 2008

(54) APPLICATION INTERFACE FOR ANALYTICAL TASKS

(75) Inventors: Achim Kraiss, Lautertal (DE); Jens Weidner, Leimen (DE); Marcus Dill, Wiesloch (DE)

(73) Assignee: SAP AG, Walldorf (DE)

( * ) Notice: Subject to any disclaimer, the term of this patent is extended or adjusted under 35 U.S.C. 154(b) by 908 days.

(21) Appl. No.: 10/652,872

(22) Filed: Aug. 29, 2003

(65) Prior Publication Data

US 2004/0230977 A1 Nov. 18, 2004

Related U.S. Application Data

(60) Provisional application No. 60/470,588, filed on May 15, 2003.

(51) Int. Cl.
*G06F 9/46* (2006.01)
*G06F 9/44* (2006.01)
*G06F 9/45* (2006.01)

(52) U.S. Cl. ...................... 718/100; 718/102; 717/110; 717/134; 717/135; 703/22

(58) Field of Classification Search ........ 718/100–108; 717/110, 134–135; 703/22
See application file for complete search history.

(56) References Cited

U.S. PATENT DOCUMENTS

| | | | | |
|---|---|---|---|---|
| 5,317,722 | A | 5/1994 | Evans | |
| 5,603,027 | A | 2/1997 | Ohkami | |
| 5,974,428 | A | 10/1999 | Gerard et al. | |
| 6,216,137 | B1 | 4/2001 | Nguyen et al. | |
| 6,460,037 | B1 | 10/2002 | Weiss et al. | |
| 6,470,333 | B1 | 10/2002 | Baclawski | |
| 6,782,390 | B2 | 8/2004 | Lee et al. | |
| 6,820,073 | B1 * | 11/2004 | Bedell et al. | 707/2 |
| 6,941,301 | B2 | 9/2005 | Ferguson et al. | |
| 6,941,318 | B1 | 9/2005 | Tamayo et al. | |
| 6,954,758 | B1 | 10/2005 | O'Flaherty | |
| 7,024,417 | B1 * | 4/2006 | Russakovsky et al. | 707/101 |

(Continued)

FOREIGN PATENT DOCUMENTS

WO WO03/005232 1/2003

(Continued)

OTHER PUBLICATIONS http://www.sas.com/news/preleases/111802/news2.html—"SAS Acquires Technology to Track Customer Behavior In Real-Time," printed form the Internet Apr. 18, 2003, 2 ps.

(Continued)

*Primary Examiner*—Meng-Al T. An
*Assistant Examiner*—Jennifer N. To
(74) *Attorney, Agent, or Firm*—Fish & Richardson P.C.

(57) ABSTRACT

One implementation provides a computer system that is capable of processing task requests from front-end software applications. The computer system is programmed to receive a task request from a front-end software application. The task request includes input values and a task name that is associated with an analytical task of a particular type to be executed. The computer system is also programmed to use the task request to select a subset of the input values needed for execution of the analytical task of the particular type, create a task invocation request that includes the selected input values, and send the task invocation request to an analytical engine.

13 Claims, 16 Drawing Sheets

U.S. PATENT DOCUMENTS

| | | | | |
|---|---|---|---|---|
| 2002/0051063 | A1* | 5/2002 | Hwang | 348/231 |
| 2002/0078039 | A1 | 6/2002 | Cereghini et al. | |
| 2003/0043815 | A1 | 3/2003 | Tinsley et al. | |
| 2003/0220860 | A1 | 11/2003 | Heytens et al. | |
| 2004/0098358 | A1 | 5/2004 | Roediger | |

FOREIGN PATENT DOCUMENTS

| | | |
|---|---|---|
| WO | 03/037018 | 5/2003 |

OTHER PUBLICATIONS http://www.epiphany.com/news/2002press/2002_08_27.html - E.Piphany—"E.Piphany Real-Time Wins CRM Excellence Award from Customer Inter@ction Solutions Magazine," printed from the Internet Apr. 18, 2003, 2 ps.

http://www.verilytics.com/products/index.html—"Verilytics Products," printed from the Internet Apr. 18, 2003, 2 ps.

http://www.dmg.org/faq.htm—"Data Mining Group: Frequently Asked Questions," printed from the Internet Apr. 18, 2003, 2 ps.

"Welcome to The Real-Time Enterprise," *PeopleSoft, Inc.*, 4460 Hacienda Drive, Pleasanton, California, undated, 8 ps.

"DataDistilleries Real-Time Suite," *DataDistilleries*, undated, 2 ps.

"DataDistilleries Analytical Suite," *DataDistilleries*, undated, 2 ps.

PowerPoint Presentation, "Analytical CRM," *SAP AG*, undated, 24 ps.

U.S. Appl. No. 10/454,370, filed Jun. 3, 2003, Kraiss et al.

U.S. Appl. No. 10/633,884, filed Aug. 4, 2003, Kraiss et al.

U.S. Appl. No. 10/664,771, filed Sep. 17, 2003, Kraiss et al.

U.S. Appl. No. 10/665,249, filed Sep. 18, 2003, Kraiss et al.

Final Office Action dated Aug. 10, 2007; U.S. Appl. No. 10/454,370.

Non-final Office Action dated Nov. 21, 2006; U.S. Appl. No. 10/454,370.

Final Office Action dated Aug. 8, 2007; U.S. Appl. No. 10/633,884.

Non-Final Office Action dated Nov. 21, 2006; U.S. Appl. No. 10/633,884.

* cited by examiner

APPLICATION INTERFACE FOR ANALYTICAL TASKS

RELATED APPLICATION

The present application claims the benefit of the filing date of U.S. Provisional Application No. 60/470,588, which was filed on May 15, 2003.

TECHNICAL FIELD

This invention relates to computing systems that utilize application interfaces for analytical task execution.

BACKGROUND

In a real-time analytics system, various front-end software applications provide customer transaction data directly to an analytical engine that is capable of executing analytical tasks. An example of such an analytical engine is a prediction engine that provides useful, predictive output relating to a transaction with a customer. An analytical engine is capable of processing real-time data from a customer to execute analytical tasks and to generate output in real time. In many instances, the analytical engine will use the real-time data in coordination with a data mining model to generate a predictive output. A data mining model is typically derived from historical data that has been collected, synthesized, and formatted. In many instances, a predictive output generated upon execution of an analytical task is fed into a business rule engine. The business rule engine will use the predictive output in conjunction with its rule set to determine if certain events should be triggered in a given front-end software application. For example, the business rule engine may determine that a special promotional offer should be provided to a particular customer given the content of the predictive output and the nature of the transaction with that customer. In some instances, the front-end software applications may directly process the predictive output.

Front-end software applications typically need to maintain direct interfaces to the analytical engines when providing real-time customer data or when requesting the execution of analytical tasks. In maintaining these interfaces, the front-end software applications are required to have detailed knowledge of the specific types of analytical engines and/or data mining models that are used. The front-end software applications will typically exchange input data directly with these analytical engines, and this data often has specialized formats that are associated with the specific types of analytical tasks to be executed. For example, the front-end software applications may need to provide input data of a particular type for the execution of prediction tasks, but may need to provide other forms of input data for the execution of analytical tasks of a different type.

SUMMARY

Various implementations of the invention are provided herein. One implementation provides a computer system that is capable of processing task requests from front-end software applications. The computer system is programmed to receive a task request from a front-end software application. The task request includes input values and a task name that is associated with an analytical task of a particular type to be executed. The computer system is also programmed to use the task request to select a subset of the input values needed for execution of the analytical task of the particular type, create a task invocation request that includes the selected input values, and send the task invocation request to an analytical engine.

Various implementations of the present invention may provide certain advantages. For example, front-end software applications are able to benefit from stable and generic application interfaces (API's) to initiate requests for the execution of analytical tasks. These API's do not need to manage variable or changing data types or formats typically arising from the exchange of data mining models and key performance indicator (KPI) sets, but rather can rely on stable connections to process various analytical tasks, such as KPI-lookup or prediction tasks. Because the front-end software applications can use generic API's, various different KPI sets, mining models, mining engines, and the like can be easily utilized without interfering with the smooth flow of information to and from the front-end software applications. The generic API's also provide transparency to the front-end software applications regarding the type of tasks to be executed. This greatly enhances the robustness and flexibility of these implementations and reduces the maintenance costs for the front-end software applications.

Certain implementations of the invention may provide additional advantages. For example, in some implementations, the front-end software applications maintain unified interfaces for all analytical tasks that are to be performed. In maintaining such interfaces, these applications are capable of using a specified format for sending and receiving application data to initiate execution of the analytical tasks. In one implementation, the front-end software applications send a set of all required input information for execution of the analytical tasks, and receive a set of output information generated from these tasks.

The details of one or more implementations of the invention are set forth in the accompanying drawings and the description below. Other features, objects, and advantages of the invention will be apparent from the description and drawings, and from the claims.

DETAILED DESCRIPTION

Figure 1A:
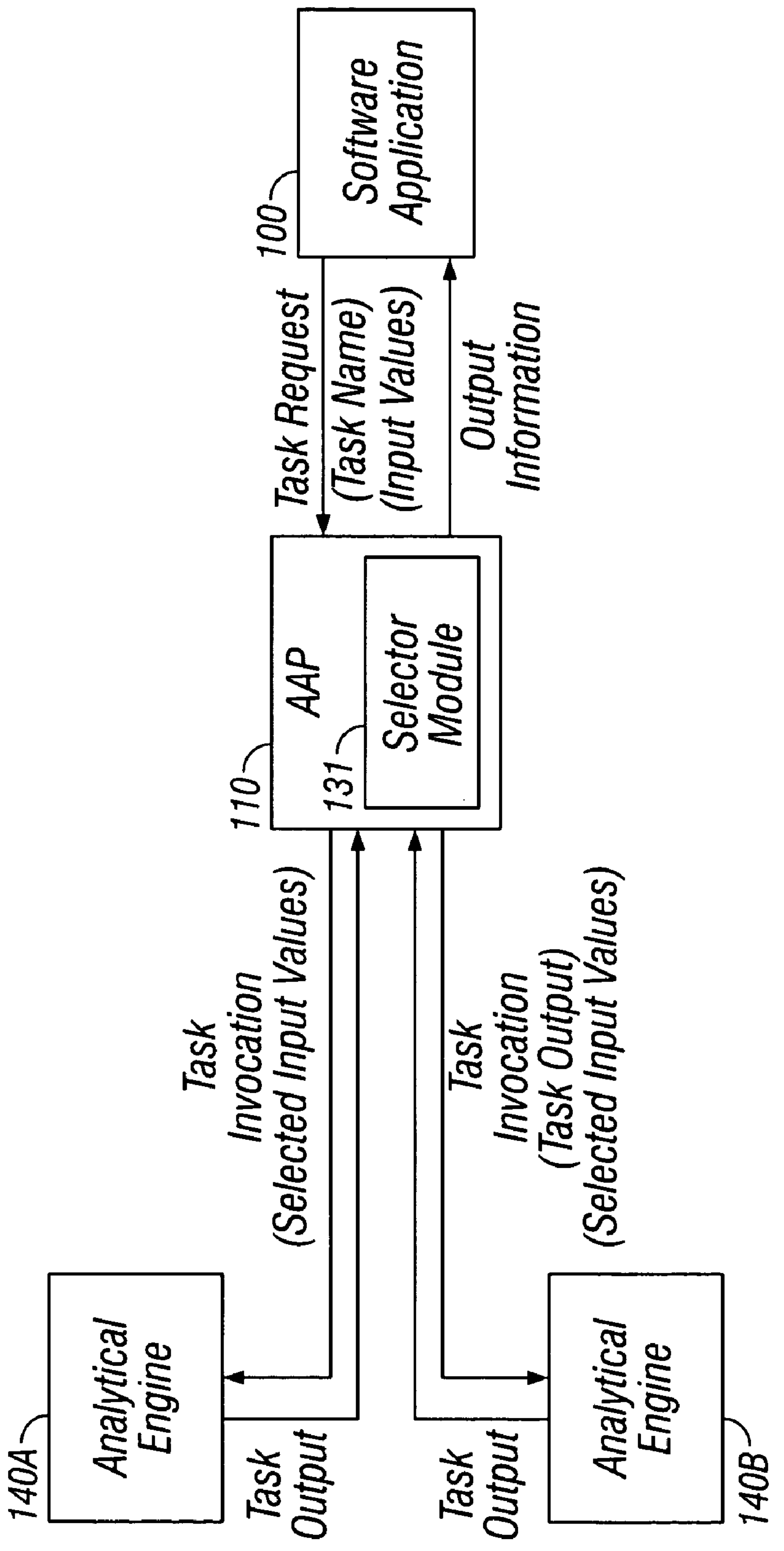
FIG. 1A is a block diagram of a computing system having an Analytical Application Provider (AAP) that is capable of processing task requests from a front-end software application, according to one implementation of the invention.

FIG. 1A is a block diagram of a computing system having an Analytical Application Provider (AAP) 110 that is capable of processing task requests from a front-end software application 100, according to one implementation. In the implementation shown in FIG. 1A, the front-end software application 100 initiates requests to execute analytical tasks, such as prediction tasks or key performance indicator (KPI) lookup tasks. The initiation of these requests may result from various events occurring during operation of the front-end software application 100. The AAP 110 receives these task requests from the front-end software application 100. The task requests each include a task name and one or more input values to be used during execution of the task. The task name is associated with an analytical task of a particular type, such as a prediction or KPI-lookup task. A selector module 131 of the AAP 110 uses the task request to select a subset of the input values from the task request needed for execution of the analytical task of the particular type. The AAP 110 then creates a task invocation request that includes the selected input values and sends the task invocation request to an analytical engine 140A or 140B that is capable of executing the analytical task of the particular type.

In the implementation shown in FIG. 1A, the selector module 131 is capable of using the task request sent from the front-end software application 100 to select an analytical engine 140A or 140B to be used for execution of the analytical task of the particular type. One or more output values are generated upon execution of the analytical task, and are passed by the analytical engine 140A or 140B as task output back to the AAP 110. The AAP 110 uses the task output to provide output information back to the front-end software application 100.

In one implementation, the AAP 110 is capable of invoking execution of analytical tasks in sequence. In this implementation, the AAP 110 receives a task request from the front-end software application 100. The AAP 110 processes the task request using the selector module 131 to invoke execution of a first analytical task by the analytical engine 140A. The selector module 131 selects a first set of the input values contained within the task request that are needed for execution of the first analytical task, and the AAP 110 sends a first task invocation request to the analytical engine 140A that includes the first set of the selected input values. The AAP 110 then is capable of invoking execution of a second analytical task by the analytical engine 140B. The selector module 131 selects a second set of the input values contained within the task request that are needed for execution of the second analytical task. The AAP 110 then sends a second task invocation request to the analytical engine 140B that includes the second set of the selected input values and also the task output information generated upon execution of the first analytical task. In one implementation, the first and second set of the selected input values contain one or more common input values that are included in both the first and second task invocation requests.

A user or administrator may define the scope and content of the request that is sent from the front-end software application 100 to the AAP 110 for executing the analytical task. This may occur at design-time, or may occur dynamically during run-time. Because the front-end software application 100 needs only to provide the task name and input value information, the definition of tasks on the AAP 110 allow the selector module 131 to determine the analytical engines that are to be used, and also allows the selector module 131 to select the input values that are needed for task execution. (FIG. 7A and FIG. 9, which are described later, provide examples of task definitions within the AAP 110.) By altering the task definitions, different engines can be easily introduced into the system without changing the interface between the AAP 110 and the front-end software application 100.

In some implementations, the AAP 110 also contains mapping functionality. When the AAP 110 receives certain input information from the front-end software application 100 in the task request, a mapping function translates the input values selected by the selector module 131 into formats usable by the selected analytical engine 140A or 140B. After the selected analytical engine 140A or 140B executes a given task, it sends task output information to the AAP 110. In some implementations, the mapping function of the AAP 110 translates one or more values of this output information into translated output information that is then sent back to the front-end software application 100. In this fashion, the mapping function is capable of formatting the output information into a type that is expected by the front-end software application 100.

The front-end software application 100 need not be directly coupled to the analytical engines 140A or 140B, and this provides certain advantages. For example, the front-end software application 100 need not specify the precise analytical engine that is to be used, but need only specify the name of the task that is to be executed. The task definition in the AAP 110 contains the information of the engine to be used for task execution, which could be changed dynamically without impact to the front-end software application 100. This provides independence for the front-end software application 100, leading to reduced maintenance costs.

As shown in FIG. 1A, requests and responses flow directly between the front-end software application 100 and the AAP 110. In many implementations, a business rule engine, such as the business rule engine 108 shown in FIG. 1C, couples the front-end software application 100 with the AAP 110. In these implementations, the business rule engine 108 passes requests sent from the front-end software application 100 directly to the AAP 110. The business rule engine 108 also passes responses from the AAP 110 to the front-end software application 100. In addition, the business rule engine 108 also uses the output information in the responses sent from the AAP 110 to determine if certain events should be signaled to other rules, or if certain actions should be processed in the front-end software application 100. As part of the analytical front-end, the business rule engine 108 provides functionality for the business rules that are to be applied. For example, the business rule engine 108 may apply certain rules that initiate the offering of special discount offers to new or existing customers.

In the implementation shown in FIG. 1A, the front-end software application 100 and the analytical engines 140A and 140B are located externally from the AAP 110. In other implementations, the front-end software application 100 or the analytical engines 140A and 140B may be located within the AAP 110.

In some implementations, the analytical engines 140A and 140B use one or more data stores when executing analytical tasks. In one implementation, the analytical engine 140A is a KPI engine that uses a KPI set when executing KPI-lookup tasks. In one implementation, the analytical engine 140B is a prediction engine that uses a data mining model when executing prediction tasks.

Figure 1B:
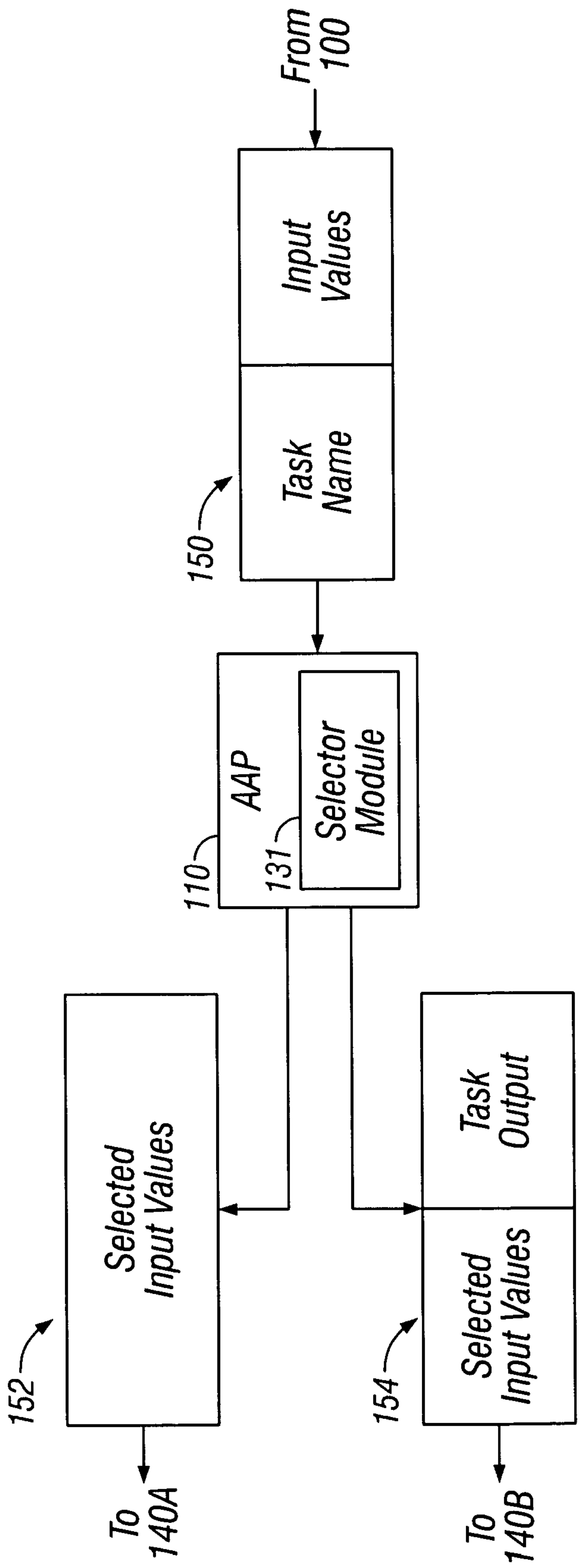
FIG. 1B is a block diagram showing the input into and the output from the AAP shown in FIG. 1A.

FIG. 1B is a block diagram showing the input into and output from the AAP 110 shown in FIG. 1A. FIG. 1B shows a task request 150 that is sent from the front-end software application 100 to the AAP 110. As shown, the task request 150 contains a task name and one or more input values. The AAP 110 uses its selector module 131 to select a subset of the input values from the task request 150 needed for execution of a first analytical task, such as a KPI-lookup task. In many scenarios, the subset of the input values from the task request 150 needed for execution of a first analytical task will include at least one of the input values. In other scenarios, the first analytical task will not require any of the input values for execution. In these scenarios, the subset of selected input values will be empty.

The selector module 131 uses the task name, in one implementation, to determine the input values that are needed for a particular task type. The AAP 110 includes these selected input values in a first task invocation request 152 that is sent to the analytical engine 140A. The analytical engine 140A is capable of then executing the first analytical task.

The AAP 110 also uses its selector module 131 to select a subset of the input values from the task request 150 needed for execution of a second analytical task, such as a prediction task. The AAP 110 includes these selected input values, along with the task output generated from the execution of the first analytical task on the analytical engine 140A, in a second task invocation request 154 that is sent to the analytical engine 140B. The analytical engine 140B is capable of then executing the second analytical task.

As shown in FIG. 1B, the task invocation requests 152 and 154 each contain one or more of the input values contained in the task request 150. In one scenario, the input values contained within the task invocation request 152 may be distinct from the input values contained within the task invocation request 154. In another scenario, there may be one or more common input values that are contained within the task invocation requests 152 and 154. In this scenario, these common input values would be needed for execution of each of the first and second analytical tasks.

Figure 1C:
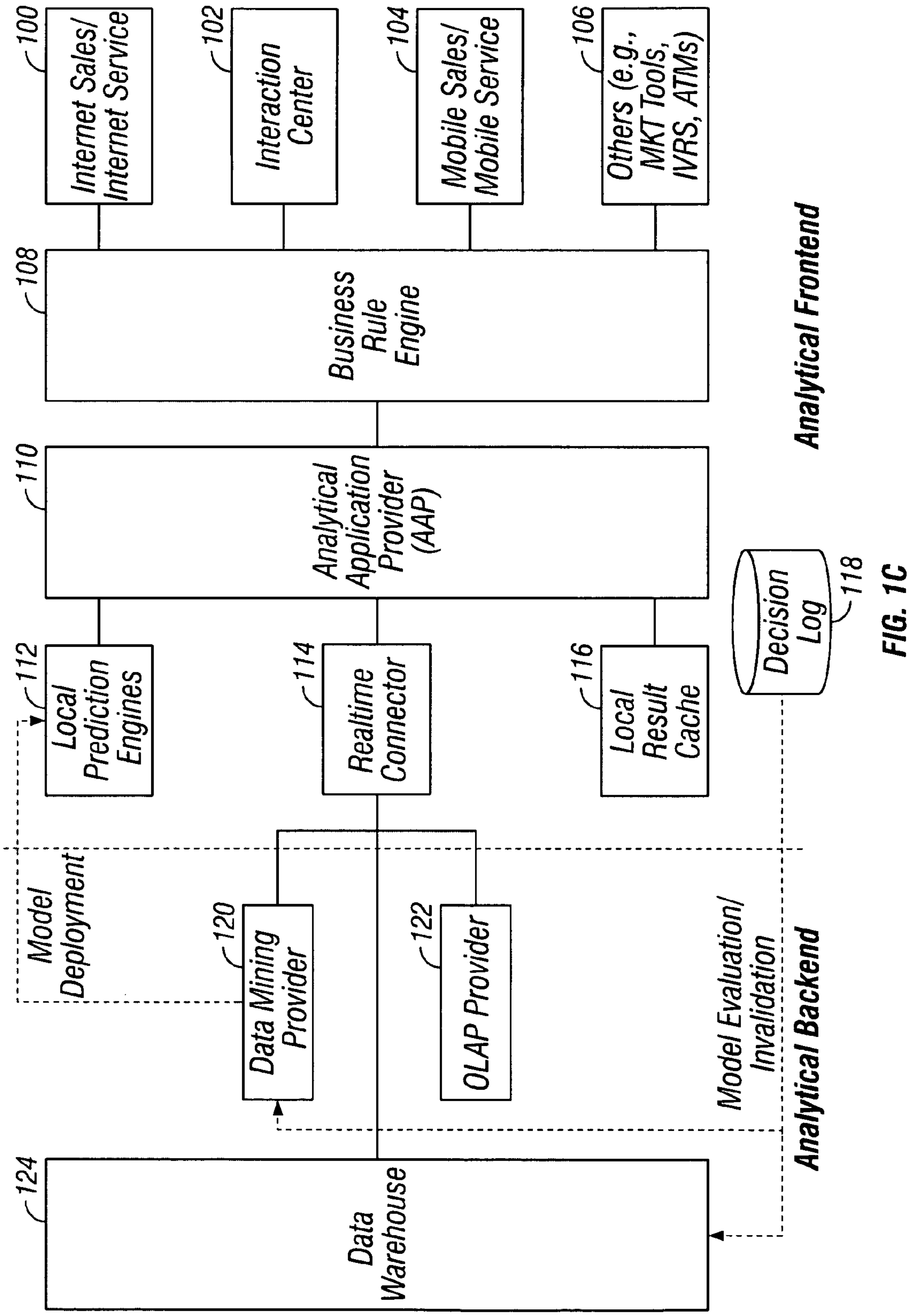
FIG. 1C is a block diagram showing the integration of software applications with analytical engines using the AAP shown in FIG. 1A.

FIG. 1C is a block diagram of a computing system that incorporates the components shown in FIG. 1A. In this data processing system, Analytical Application Provider (AAP) 110 couples front-end software applications (such as applications 100, 102, 104, or 106) with analytical engines, such as prediction servers or key performance indicator (KPI) servers, during the execution of analytical tasks. The analytical engines may be local to AAP 110, or may instead be part of an analytical back-end. For example, the local prediction engines 112 are local to AAP 110, while the data mining provider 120 and OLAP (online analytical processing) provider 122 are part of the analytical back-end. Engines 140 shown in FIG. 1A may be contained within local prediction engines 112 is some implementations, and may be contained in data mining provider 120 or OLAP provider 122 in other implementations. Model repository 134 shown in FIG. 1A may be contained within local cache 116 in some implementations, and may be contained within data warehouse 124 in others. After analytical tasks have been executed by the corresponding analytical engines, AAP 110 then routes output information generated from the execution of these tasks back to front-end software applications 100, 102, 104, or 106.

Data warehouse 124, data mining provider 120, and OLAP provider 122 serve as part of an analytical back-end that is coupled to AAP 110 via realtime connector 114. This analytical back-end may provide a framework and storage mechanisms for data mining models or other analytical data stores that are stored externally from AAP 110. These components of the analytical back-end are coupled to AAP 110 using real-time connector 114. Local versions of the data mining models or other data stores may be stored in local result cache 116 for faster and easier access by AAP 110. Decision log 118 is used keep track of the predictions, KPI-lookups, and the rule executions during run time of the system. The information stored in decision log 118 may be viewed by an administrator to analyze various execution results. This information may also be used to judge the quality of prediction models and rules, and may also be fed back into data warehouse 124 for sophisticated long-term analyses. Based on these analyses, models may be re-trained, or updated, and rules may be re-adjusted and be automatically deployed to AAP 110 without impact to the front-end software applications.

In one scenario, a data mining expert may create and update mining models with data from a customer knowledge base in data warehouse 124. The data within data warehouse 124 could include customer profiles, historical customer orders, etc. OLAP provider 122 provides direct access to KPI information derived from customer profiles, historical customer orders, etc. Data mining provider 120 is used for model deployment, and data mining provider 120 also provides an interface to AAP 110 for executing remote predictions based on mining models located in data warehouse 124. Using real-time connector 114, a mining model can be exported to AAP 110. In one implementation, the model is in a PMML-compliant format. A PMML-compliant format is one that adheres to the syntax of the standardized Predictive Modeling Markup Language (PMML). PMML is used to define the components of a model in a standard form that can be interpreted by other computing systems.

In one implementation, real-time connector 114 can also connect to third-party mining providers, which themselves can export and import models and provide predictions based on their local models. These third-party mining providers can be located on local or remote servers.

It is not necessary that the system include data warehouse 124, data mining provider 120, OLAP provider 122, and real-time connector 114. For example, these components are not needed when the data stores used during the execution of analytical tasks are stored in local cache 116 and when local engines, such as local prediction engines 112, are utilized.

Figure 2:
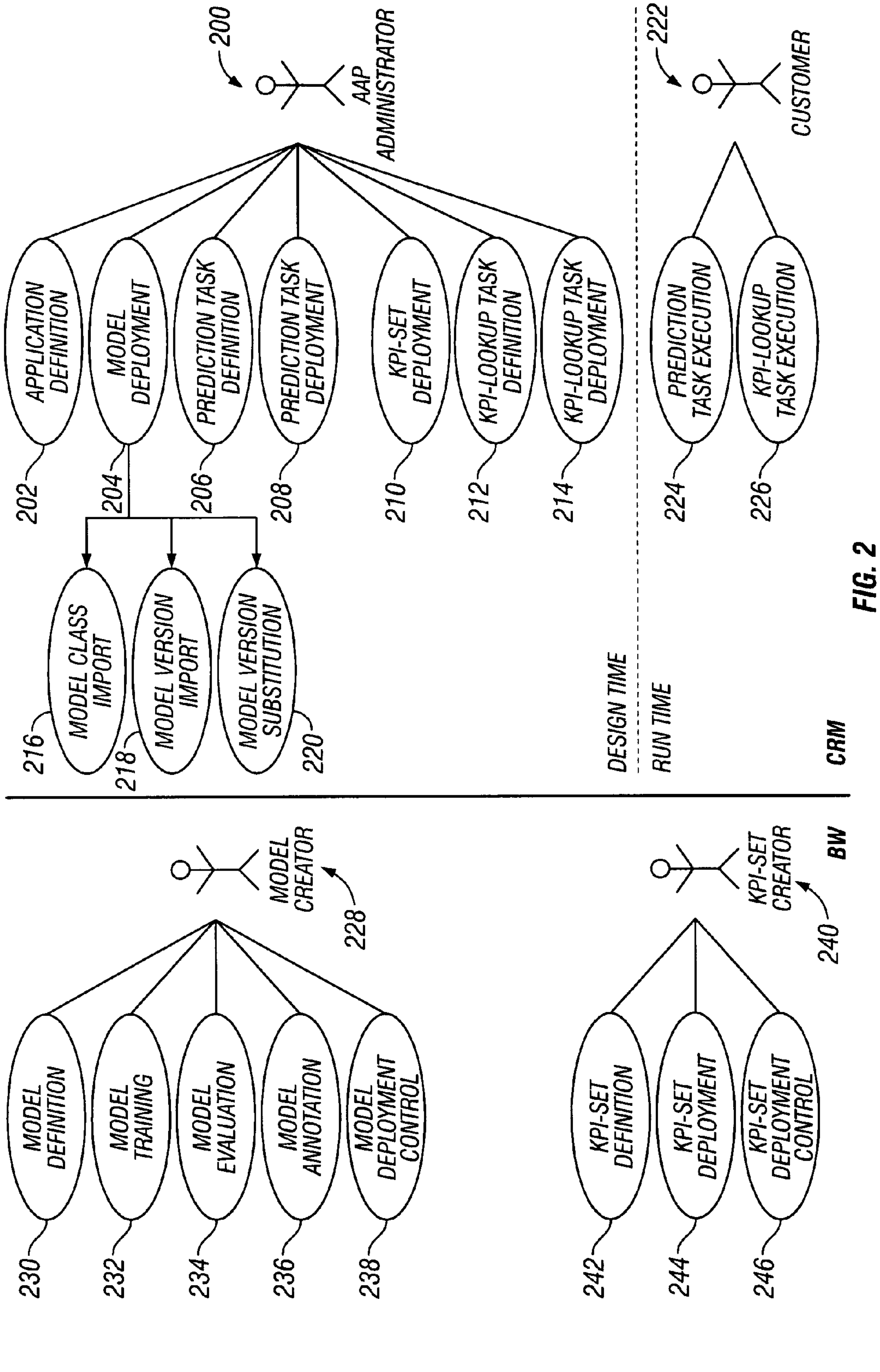
FIG. 2 is a use-case diagram of design- and run-time scenarios for various implementations of the invention.

FIG. 2 is a use-case diagram of design- and run-time scenarios for various implementations of the invention. FIG. 2 illustrates various use cases performed by the pictured actors in various design- and run-time scenarios. The use cases shown in FIG. 2 are performed to achieve various analytical functions in a computer system, such as the system shown in FIG. 1C.

FIG. 2 first shows various aspects of mining model creation. Model creator 228 is responsible for model definition 230, model training 232, model evaluation 234, model annotation 236, and model deployment control 238. These use cases typically occur within a data warehouse or a business information warehouse (BW). Model definition 230 includes the logical definition of a mining model that will be used within the system in terms of the information that will flow into the model. Model training 232 includes updating the model over time as it is used. Model evaluation 234 includes testing the quality and effectiveness of the model. Model annotation 236 includes annotating model semantics using textual descriptions to precisely describe the "rules" in the model. The annotations can be related to the entire model, as well as to individual elements of the model such as categories and clusters. Model annotations play an important part in allowing an AAP administrator to understand how a model can be applied for predictions in front-end software applications. Model deployment control 238 includes deploying and exporting the model to AAP 110.

KPI-set creator 240 is responsible for KPI-set definition 242, KPI-set deployment 244, and KPI-set deployment control 246. KPI's, or key performance indicators, are key indicators or figures that can be derived from the data collected in a warehouse, such as data warehouse 124. KPI's may include such indicators as customer revenues and profits. KPI's may also contain aggregated customer information or other pre-calculated information. KPI's may be sorted by user or user category. KPI-set definition 242 includes logically defining the KPI's that are to be a part of the KPI-set, as well as defining the source of the KPI's. KPI-set deployment 244 and deployment control 246 include the deployment of the KPI-set to AAP 110.

The use cases shown in FIG. 2 include both design- and run-time use cases. At design-time, AAP administrator 200 is responsible for application definition 202, model deployment 204, prediction task definition 206, prediction task deployment 208, KPI-set deployment 210, KPI-lookup task definition 212, and KPI-lookup task deployment 214. Model deployment 204 includes model class import 216, model version import 218, and model version substitution 220.

Application definition 202 includes defining the scope of the particular CRM application. For example, AAP administrator 200 may define the applications shown in FIG. 1C, such as Internet sales/service 100, interaction center 102, or mobile sales/service 104. Model deployment 204 includes actually deploying of the model to be used within the system. In one implementation, deployment is restricted to specific roles. In this implementation, deployment controls may become part of the model definition. For example, the deployment of a specific model could be restricted to specific users/roles or also to specific applications. These deployment controls create a deployment authorization framework.

As part of model deployment 204, model class import 216 includes importing or manually defining the model class to be used. Model classes are containers for structurally equivalent models. The fields of model classes are a superset of all model fields of model versions belonging to the same class. Model versions are mining models within a model class. The model classes that can be used are ones that have been previously defined during model class deployment. In addition to importing the model class, AAP administrator 200 must also identify and import the model version, which constitutes model version import 218. The model version contains the most current model information. As time progresses, model information needs to be continually updated. As such, newer and more recent model versions may need to be imported into the system to substitute the older versions. Therefore, model deployment 204 also includes model version substitution. The model class and model versioning concepts allow an administrator to easily switch between different model versions by changing the version number, without needing to make completely new specifications for the new model versions. For example, mappings for the old model version can be inherited and re-used for the new model version, as model versions use the same data formats and model fields.

Prediction task definition 206 includes defining a prediction task that is to be deployed by the system. Prediction tasks are used by the application at run-time to obtain prediction information from analytical models. Prediction tasks may include prediction engine and mining model definitional information, so that the AAP may properly select these components for task execution at run time. These tasks may further include input field value information needed for execution of the tasks. Prediction task deployment 208 includes actual deployment of the prediction task within the application that had previously been defined during prediction task definition 206. Upon such deployment, the application has the capability to implement the prediction tasks later (i.e., at run time).

KPI set deployment 210 includes deployment of the KPI set within an application that had been previously defined during KPI set definition 242. Upon deployment, the KPI set is available for later use by the application at run time. KPI-lookup task definition 212 includes defining a KPI-lookup task that is to be deployed by the system. KPI-lookup tasks are used by the application at run-time to obtain KPI information. KPI sets are originally created by KPI set creator 240, as described earlier. KPI-lookup tasks may include KPI-set definitional information, so that the AAP may properly select the appropriate KPI-set used at run time during task execution. These tasks may further include input field value information needed for execution of the tasks. Lastly, KPI-lookup task deployment 214 includes actual deployment of the KPI-lookup task within the application. Upon such deployment, the application has the capability to implement the KPI-lookup tasks later (i.e., at run time).

At run-time, prediction task execution 224 and KPI-lookup task execution 226 occur while a front-end software application, such as application 100, 102, 104, or 106 shown in FIG. 1C, processes a transaction with customer 222. In one implementation, customer 222 is involved in a session using Interaction Center application 102. An Interaction Center is an on-line interactive session between a customer and a call-center agent. The call-center agent has the ability to answer the customer's questions, and to provide feedback directly to the customer during the on-line session. Both the customer and call-center agent may use a web-based interface to communicate with one another. In another implementation, customer 222 is involved in a session using Internet sales/service application 100.

Prediction task execution 224 and KPI-lookup task execution 226 are initiated by requests sent from front-end software applications 100, 102, 104, or 106. These front-end software applications send requests to initiate the analytical tasks 224 or 226 as a direct result of real-time interaction with customer 222. Front-end software applications 100, 102, 104, or 106 determine when requests for analytical tasks 224 or 226 are to be invoked as a result of the context and state of the transaction with customer 222.

KPI-lookup task execution 226 includes executing a run-time KPI-lookup task. This KPI-lookup task is one that had been previously defined and deployed at design-time. As noted earlier, KPI-lookup tasks utilize the KPI-sets to lookup KPI information that is sent back to the front-end software applications.

Prediction task execution 224 includes executing a run-time prediction task. This prediction task is one that had been previously defined and deployed at design-time. As noted earlier, prediction tasks utilize mining models, such as predictive models. Prediction tasks use real-time information provided by the application to generate prediction results as output (e.g., customer attractiveness). In one implementation, prediction tasks also use KPI information (e.g., customer revenue) in generating predictions. An application may use the predictive output, along with business rules, to determine if customer 222 will be provided with special offers, promotions, and the like.

Figure 3:
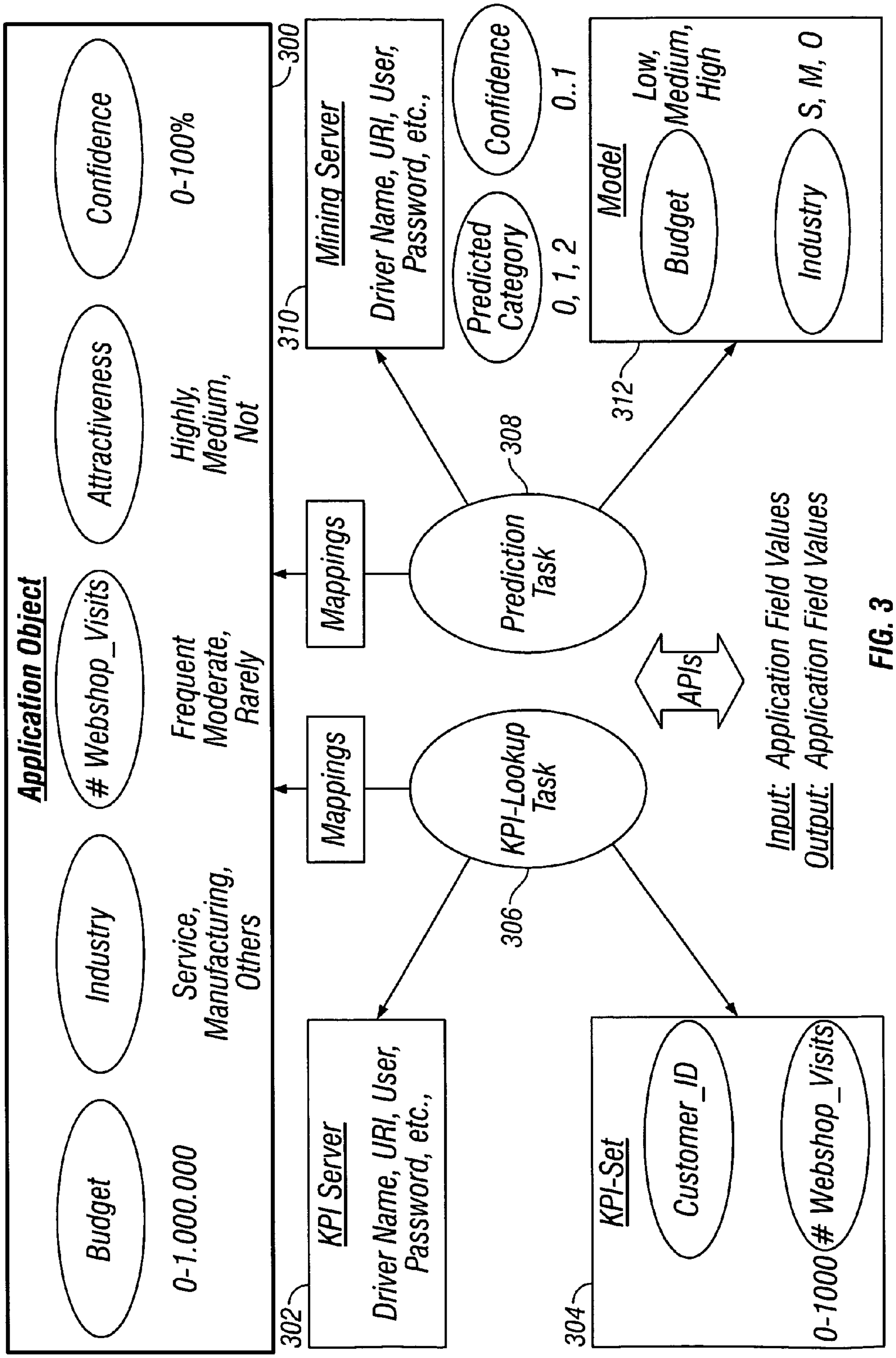
FIG. 3 is a conceptual diagram of an exemplary object model for the AAP.

FIG. 3 is a conceptual diagram of an exemplary object model for the AAP. The objects shown in FIG. 3 are included within an exemplary object model designed for the AAP. The design shows an implementation of how such tasks could be executed in a system such as the one shown in FIG. 1A. FIG. 3 shows how an application interacts with an AAP, such as AAP 110 shown in FIG. 1A, to implement KPI-lookup and prediction tasks. In particular, FIG. 3 shows various mappings between elements within an application object to elements used for KPI-lookup and prediction tasks.

FIG. 3 shows application object 300, KPI server 302, KPI set 304, mining server 310, model 312, KPI-lookup tasks 306, and prediction task 308. Application object 300 maintains information that can be provided by an application as input for the execution of tasks at run time. KPI server 302 manages KPI operations and interactions. Therefore, KPI server 302 keeps driver names for the drivers to connect to the KPI providers (engines), and user identifications, passwords, etc. as login credentials for the KPI providers. KPI server 302 manages these operations at run time to facilitate the functionality required for KPI-lookup tasks. KPI set 304 includes stored KPI information that can be retrieved during a KPI-lookup task. Mining server 310 manages prediction operations and model import/export. Therefore, mining server 310 keeps driver names for the drivers to connect to the mining providers (engines), and user identifications, passwords, etc. as login credentials for the mining providers. Mining server 310 manages these operations at run time to facilitate the functionality required for prediction tasks. Model 312 includes stored information for the predictive model used during a prediction task. In one implementation, model 312 and KPI set 304 represent data stores that are stored locally within the AAP, such as AAP 110 shown in FIG. 1A. Mining server 310 and KPI server 302 provide connections to mining providers and KPI providers. These providers can be local to the AAP (e.g., in the case of a local prediction engine), or can be connections to remote providers.

As shown in FIG. 3, application object 300 contains various attributes, or fields. For example, application object 300 may contain a budget field, an industry field, a "# of webshop visits" field, an attractiveness field, and a confidence field. These fields include both input and output. Input fields are those maintained by application object 300 and used as input for either KPI-lookup or prediction tasks. Output fields are those obtained as output from the KPI-lookup or prediction tasks. The budget and industry fields are input fields. The "# of webshop visits", attractiveness, and confidence fields are output fields. The budget field indicates a given budget that applies to a given industry. The industry field indicates the type of industry (such as service, manufacturing, or other). These two input fields are used by model 312 (during prediction task 308) to help generate predictive output. This predictive output generates the output fields attractiveness (high, medium, or none) and confidence level (0-100%). The attractiveness field indicates whether an individual is an attractive candidate, and the confidence field indicates the confidence rating of the prediction. These output fields can be used in coordination with business rules to determine if a given customer will be given a special offer or promotion. For example, if the customer is predicted as a highly attractive one with a 75% (or higher) confidence rating, the business rules would indicate that a special promotion should be offered. The "# of webshop visits" field is also an output field. The value of this output field is provided by KPI set 304 to indicate if an individual has visited a webshop frequently, moderately, or rarely. In one implementation, the "# of webshop visits" field may also be used as input for prediction task 308.

An operational CRM system implements KPI-lookup tasks and prediction tasks (such as tasks 306 and 308), as shown in the example in FIG. 3. KPI-lookup task 306 uses KPI server 302 and KPI set 304 and provides for the run-time functionality of looking up KPI information. This KPI information is then sent back to application object 300. This KPI information may be used directly by application object 300, or may additionally be used as input to a prediction task, such as prediction task 308.

KPI-lookup task 306 will be initiated by the application in FIG. 3, and will use input information as specified in application object 300. Although not shown, application object 300 may provide a customer ID that will be used by KPI-lookup task 306. In one implementation, the customer ID is an input field in application object 300. KPI-lookup task 306 uses KPI server 302 to help manage the functionality required for run-time execution of the task. In addition, KPI-lookup task 306 will use the input information from application object 300 to obtain the requested KPI information from KPI set 304. In one implementation, KPI-lookup task 306 contains mapping information for use by the AAP to translate field information in application object 300 to field information used by KPI set 304. In addition, KPI-lookup task 306 also contains mapping information for use by the AAP to translate field information from KPI set 304 back to application object 300. This mapping functionality may be required to directly map field elements, or to also possibly convert between differing field data types. For example, KPI set 304 maintains a "# of webshop visits" field having values from 0-1000. Application object 300, however, maintains a separate "# of webshop visits" field having the values of "frequent," "moderate," and "rare." Thus, these separate fields in KPI set 304 and application object 300 do not have the same data type. KPI-lookup task 306 contains mapping functionality to translate the values from one "# of webshop visits" to the other. For example, the mapping functionality may designate that "# of webshop visits" in KPI set 304 having values between 0-50 map to the value of "rare" within application object 300. Similarly, values between 51-600 may map to the value of "moderate," and values between 601-1000 may map to the value of "frequent." These and other forms of mapping functionality may be utilized by KPI-lookup task 306.

In some implementations, prediction task 308 or KPI-lookup task 306 may require input that is not available to, or provided by, application object 300. In these implementations, the mapping functionality provides the missing information. This information could include certain default values or constants. In some implementations, the mapping functionality dynamically determines the input that is provided to the task based on the context of the information in application object 300.

Prediction task 308 uses mining server 310 and model 312 to help manage the functionality required for run-time execution of the task. Prediction output information is provided to application object 300, which may later be processed by one or more business rules. At run time, an application initiates prediction task 308 and provides input information, such as budget and industry information. Prediction task 308 processes this input information in model 312 in using mining server 310. Model 312 is a predictive model that is capable of generated predictive output when processed by mining server 310. Model 312 uses the input information for budget and industry and generates predictive output for an attractiveness category and for confidence. The predictive output is then sent back to application object 300. Prediction task 308 also contains mapping information for use by the AAP to map field values between application object 300 and model 312. For example, both application object 300 and model 312 contain budget and industry fields. These are input fields. In general, input fields may be used to hold a wide variety of information, including customer or attribute information. However, the field data types often need to mapped to one another. In some cases, direct mapping is possible between field values. For example, the industry field values in application object 300 (service, manufacturing, and others) can be directly mapped to the industry field values in model 312 (S, M, O) because these field values have substantially the same data types. In other cases, indirect mapping, or conversion, is required. For example, the budget field values in application object 300 (0-1,000,000) cannot be directly mapped to the budget field values in model 312 (low, medium, high). Therefore, the AAP needs to be capable of translating between these field values using an indirect, or conversion, function. For example, values from 0-100,000 may be mapped to "low." Similarly, values from 100,001-700,000 may be mapped to "medium," and values from 700,001-1,000,000 may be mapped to "high."

Additionally, both application object 300 and model 312 contain predicted attractiveness category and confidence fields. These are output fields. These fields also must be mapped to one another. Prediction task 308 uses model 312 and mining server 310 to generate an attractiveness category of 0, 1, or 2. These must be mapped to the attractiveness field values for application object 300 of high, medium, and none. In one example, an attractiveness category of 0 could be mapped to a value of none, while a category of 2 could be mapped to a value of high. Prediction task 308 also uses model 312 and server 310 to generate a confidence of 0 . . . 1. These must be mapped to the percentages (0-100%) of the confidence field in application object 300. These and other forms of mapping functionality may be utilized by the AAP for prediction task 308.

FIG. 4 through FIG. 9 show displays of various screens that are used in designing or creating various components used in a real-time analytics system, such as the system shown in FIG. 1A. A user or administrator may use the menus and options shown on these screen displays for performing some of the use cases shown in FIG. 2, such as application definition, model definition, KPI-set definition, prediction task definition, KPI-lookup task definition, and the like. These screen displays are shown for exemplary purposes only.

Figure 4:
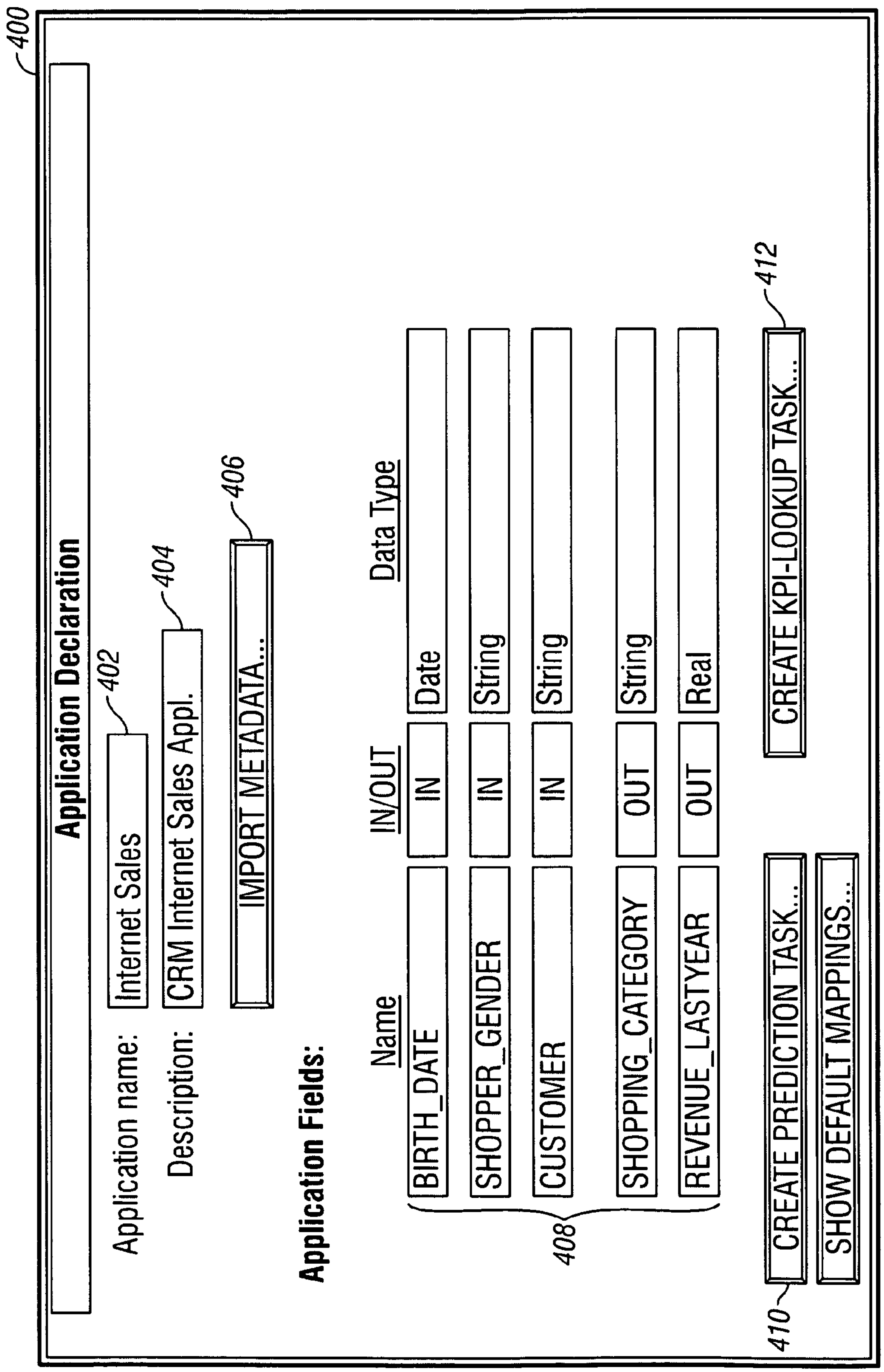
FIG. 4 is a screen display of an application declaration, according to one implementation of the invention.

FIG. 4 is a screen display of a front-end software application declaration, according to one implementation of the invention. In this implementation, screen display 400 shows an application declaration that is used during the application definition process, such as application definition 202 shown in FIG. 2. During this process, an administrator is able to set up a front-end software application that is capable of using real-time analytics functionality by invoking prediction or KPI-lookup tasks.

Screen display 400 shows a page for application declaration. This page includes name field 402, description field 404, import button 406, application fields 408, prediction task button 410, and KPI-lookup task button 412. In the example shown, name field 402 shows that the application name is "Internet Sales." Description field 404 indicates that the application is a CRM Internet sales application, such as Internet sales/service application 100 shown in FIG. 1A. Import button 406 allows a user to import metadata into the application declaration automatically, thereby relieving the user of having to manually enter the information. In one implementation, this is achieved by selection of a specification, such as a business object specification, that has been previously registered into the AAP. When a user, such as an administrator, imports this specification, all attributes are automatically imported into the declaration application.

Application fields 408 specify the specific processing fields used by the application at run time. Each application field has a name, an in/out designation, and a data type. The name is a unique name within the set of application fields 408. The in/out designation specifies whether an application field is used as input to a prediction or KPI-lookup task, or whether the field is used for output generated by the prediction or KPI-lookup task and sent back to the application. The data type indicates the type of data stored in the application field as a value. The data types shown in FIG. 4 are date, string, and real (i.e., floating point).

Prediction task button 410 and KPI-lookup button 412 are used by the administrator to create real-time tasks that are to be associated with the application. The administrator may select button 410 to create a prediction task and button 412 to create a KPI-lookup task. At run-time, after an application has been defined in the AAP, mining models can be used to allow the application to perform prediction, and KPI sets can be used to allow the application to perform KPI lookups as well.

Figure 5A:
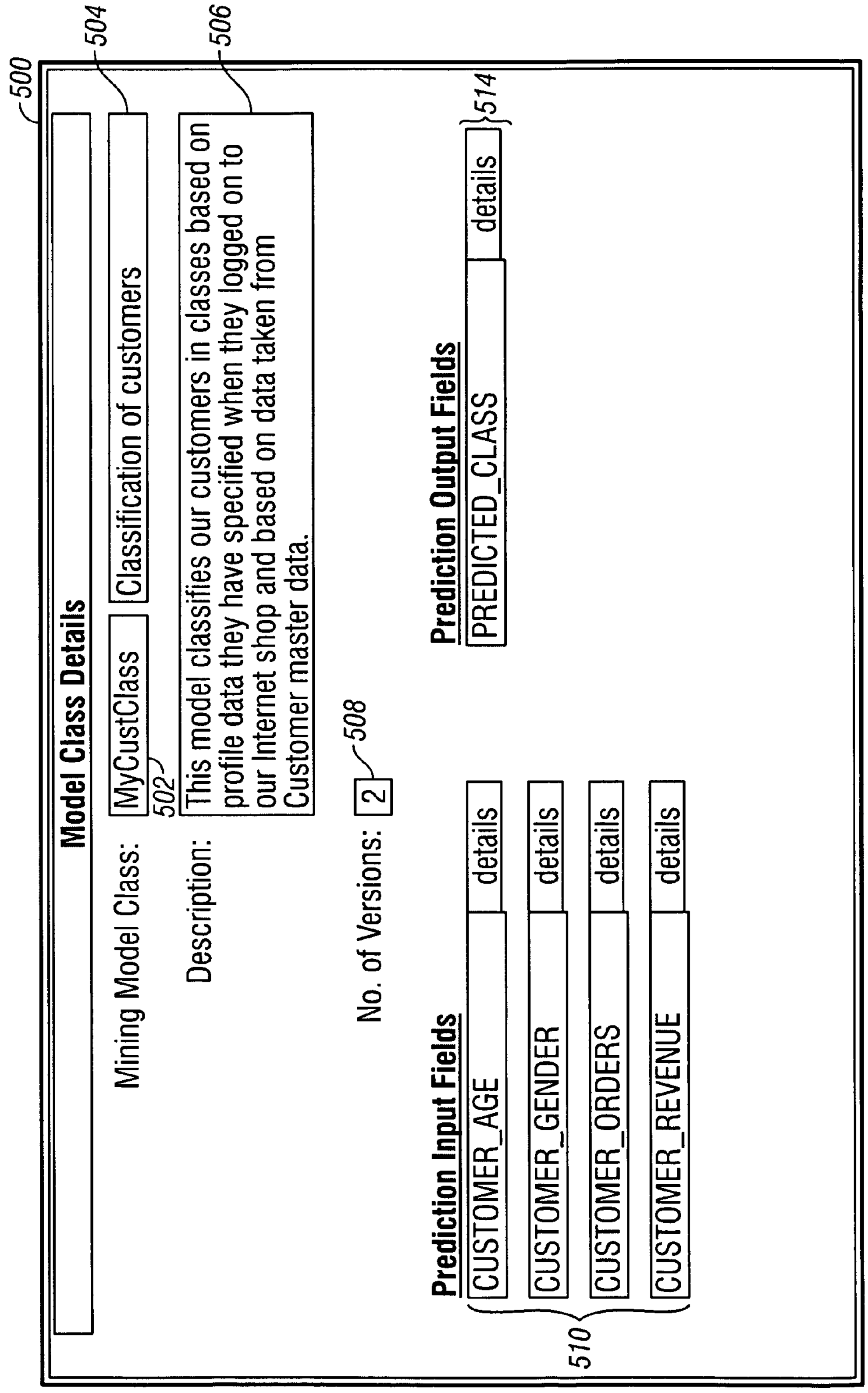
FIG. 5A is a screen display of a mining model class, according to one implementation of the invention.

FIG. 5A is a screen display of a mining model class, according to one implementation of the invention. In this implementation, screen display 500 shows the details of a mining model class that has been either manually specified by an AAP administrator or that has been automatically created by the AAP when a model version has been deployed for the model class. An AAP administrator may manually specify the model class if the set of fields is known. Alternatively, the AAP is able to automatically define the model class when it imports a version of the model class. The fields can be derived from the model version and used for the specification of the model class.

Screen display 500 shows a page for the details of a model class. Screen display 500 includes class name field 502, classification field 504, description field 506, version field 508, prediction input fields 510, and prediction output fields 514. As shown in the example in FIG. 5A, class name field 502 indicates that the name of the mining model class is "MyCustClas." Classification field 504 indicates that the model class is used for the classification of customers. Description field 506 provides the high-level description of the model class. This description is entered by the model creator. Version field 508 indicates the number of different versions that exist for the model class. A model class can have one or more versions. Later versions of the class may contain more specific or up-to-date information. The model class shown in FIG. 5A has two different versions.

Prediction input fields 510 and prediction output fields 514 indicate the input and output fields that are used for prediction by the mining model. The mining model obtains values for the input fields from the application to generate predictive output. This predictive output is captured in the prediction output fields and sent back to the application. As shown in FIG. 5A, the prediction input fields 510 include CUSTOMER_AGE, CUSTOMER_GENDER, CUSTOMER_ORDERS, and CUSTOMER_REVENUE. The values for these fields originate in the application and are provided to the model class through the execution of prediction tasks, in one implementation. The prediction output fields 514 include the PREDICTED_CLASS field. The value of this field is sent back to the application after the prediction has been generated.

Details buttons are used for providing detailed information about the fields. The model creator may select one of these buttons to view or enter detailed information about prediction input fields 510 or about prediction output fields 514.

Figure 5B:
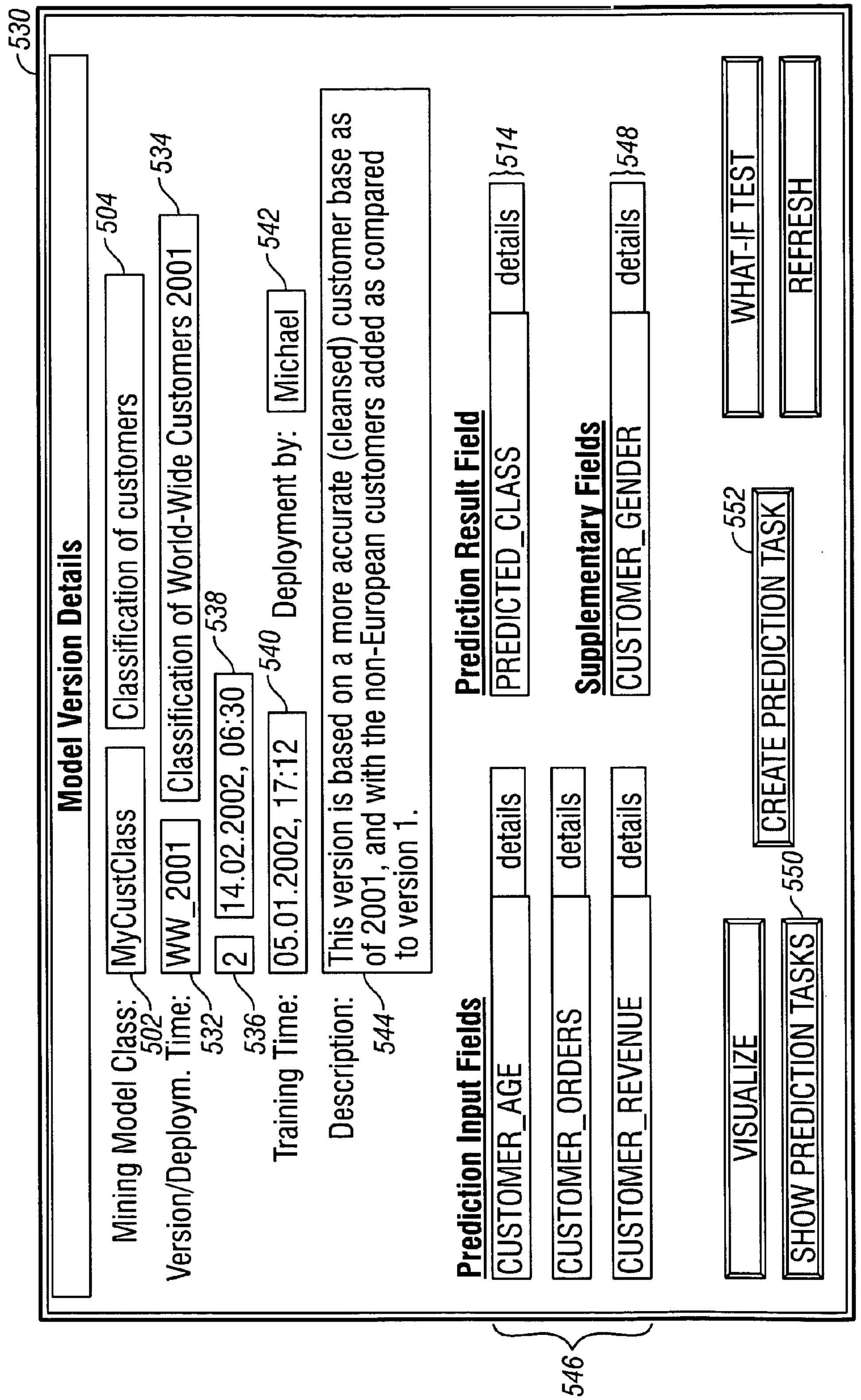
FIG. 5B is a screen display of model version details for the mining model class shown in FIG. 5A.

FIG. 5B is a screen display of model version details for the mining model class shown in FIG. 5A. The model shown in the example of FIG. 5B is a version of the model that was earlier described in FIG. 5A. An administrator is capable of defining one or more versions of a mining model. In one implementation, all model versions have a compliant set of logical attributes. That is, the fields of a model version are a subset of the model class fields, and the data type of the model version field is the same or a more specific one than that of the model class. For example, if the data type of the model class field CUSTOMER_AGE is an integer, then the data type of a model version field of CUSTOMER_AGE may be a real number.

In screen display 530 shown on FIG. 5B, field 532 indicates the name of the specific model version, and field 534 provides a brief description of the version. Version field 536 indicates the version number, and deployment time field 538 provides the date and time to indicate when the model version was deployed. By looking at these fields, an administrator is able to determine how current a given model version is. Training time field 540 indicates when the model version was trained, and field 542 provides information to indicate who deployed the model version. Description field 544 provides a more detailed description of the model version. In the example shown in FIG. 5B, description field 544 indicates that the model version is based on a more accurate customer base as of 2001 and includes non-European customers.

In FIG. 5B, prediction input fields 546 are a subset of those shown from fields 510 in FIG. 5A. Notice that prediction input fields 546 include only CUSTOMER_AGE, CUSTOMER_ORDERS, and CUSTOMER_REVENUE. They do not include CUSTOMER_GENDER, which is included in the set of fields 510 of FIG. 5A. Instead, the CUSTOMER_GENDER field is included in the set of supplementary fields 548. In one implementation, supplementary fields 548 are not necessary, as input, to the prediction process. In this implementation, supplementary fields 548 are still included in the definition, and mapping functionality for these fields is still provided. The reason for this is that supplementary fields 548 may become required fields for the prediction task in the next version of the model used for the predictions, and this facilitates the dynamic substitution of one model version to the next. This structure demonstrates that a model version may have a slightly different organization than its model class. FIG. 5B shows that the model version contains the same set of prediction output (i.e., result) fields 514 as the model class.

Button 550 is used for showing all prediction tasks that are associated with the given model version. In addition, button 552 may be selected for creating a new prediction task to be associated with the model version. These prediction tasks are also associated with the host application, according to one implementation.

Figure 6A:
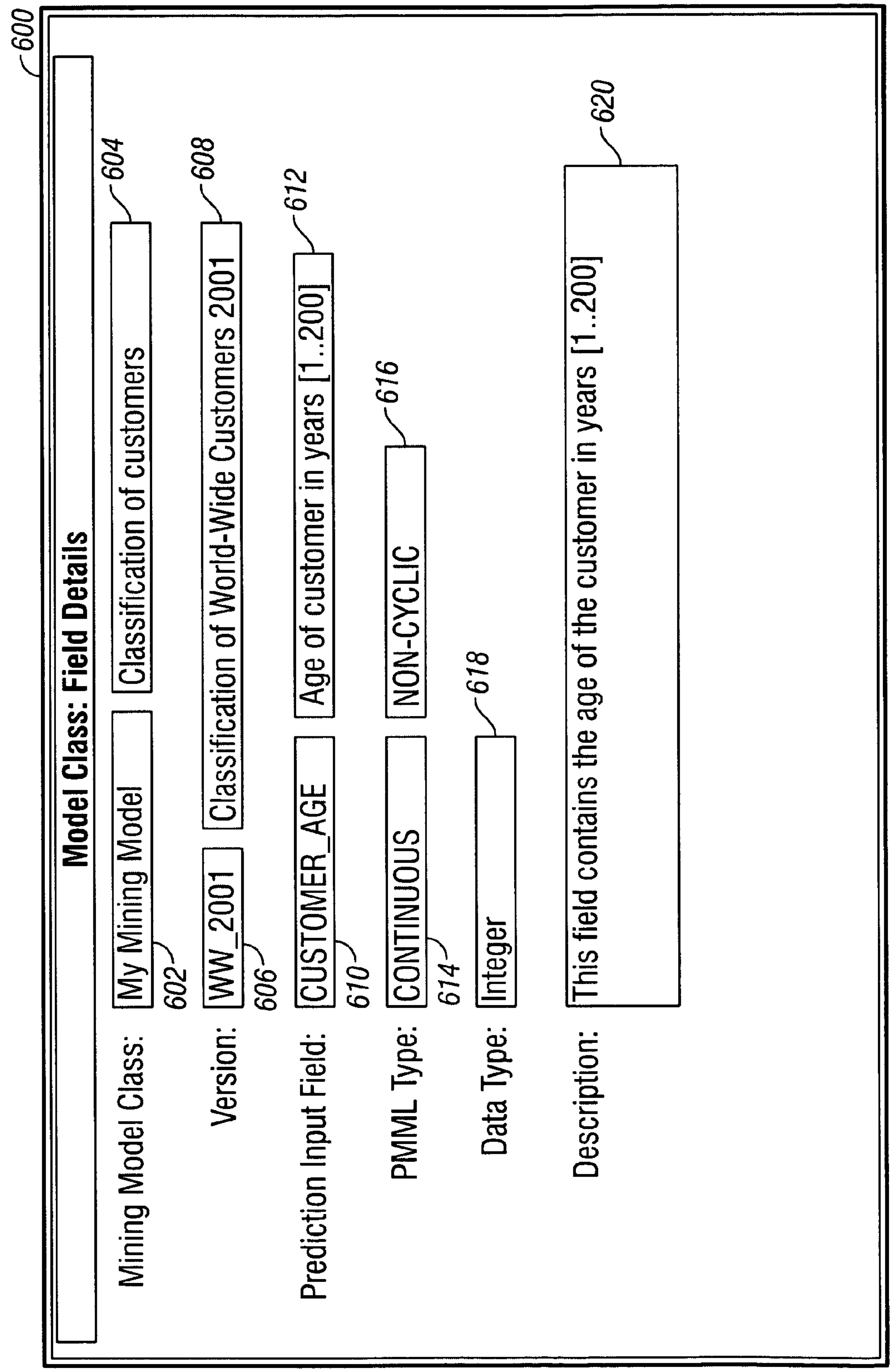
FIG. 6A is a screen display of field details for a model class, according to one implementation.

FIG. 6A is a screen display of field details for a model class, according to one implementation of the invention. FIG. 6A shows the details for the prediction input field of CUSTOMER_AGE that was shown in FIG. 5A. In one implementation, a model creator selects one of the details buttons to bring up the page shown in screen display 600 to view or entered detailed information about this input field.

Screen display 600 shows a page having various fields. These include class reference field 602, classification field 604, version field 606, version description field 608, prediction reference field 610, data description field 612, model type fields 614 and 616, data type field 618, and general description field 620. Class reference field 602 shows the mining model class with which the prediction field is associated. In the example shown, the associated class is "My Mining Model." Classification field 604 refers to the classification used for the class.

Version field 606 shows the class version being utilized. As described earlier, a mining model class may have one or more versions. The version shown in FIG. 6A is "WW_2001," which is used for the classification of World Wide customers in 2001, as indicated by version description field 608. Prediction reference field 610 indicates the name of the prediction field for which details are provided. As shown, the field is the CUSTOMER_AGE prediction input field, and data description field 612 indicates that this field designates the age of customers in the year range [1 . . . 200]. Model type fields 614 and 616 specify the model type for the model class. In the example shown in FIG. 6A, the model is one defined using the Predictive Modeling Markup Language (PMML), and the PMML types are continuous and non-cyclic. Data type field 618 indicates that the CUSTOMER_AGE field contains integer values. Lastly, general description field 620 provides a brief general description of the CUSTOMER_AGE field.

Figure 6B:
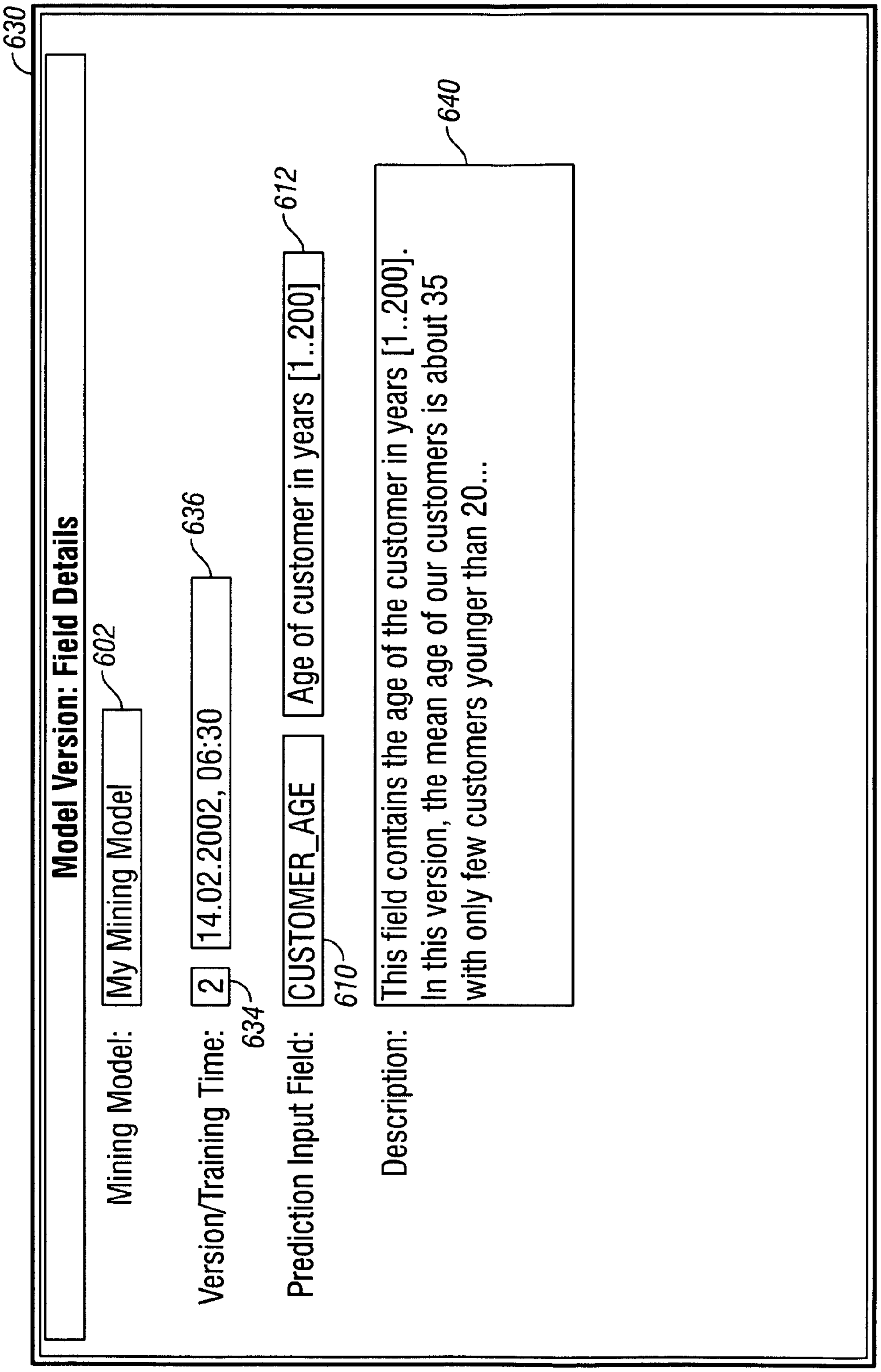
FIG. 6B is a screen display of field details for a model version, according to one implementation.

FIG. 6B is a screen display of field details for a model version, according to one implementation. In this implementation, a screen display 630 shows the field details for a specific field in a model version that is based on the field for the model class shown in FIG. 6A. A user, such as a designer, can create these field details for a given model version. The screen display 630 shows the class reference field 602, a version identifier field 634, a training time field 636, the prediction reference field 610, the data description field 612, and a field description field 640. Each of these fields provide information about a particular element used in the model version.

Figure 7A:
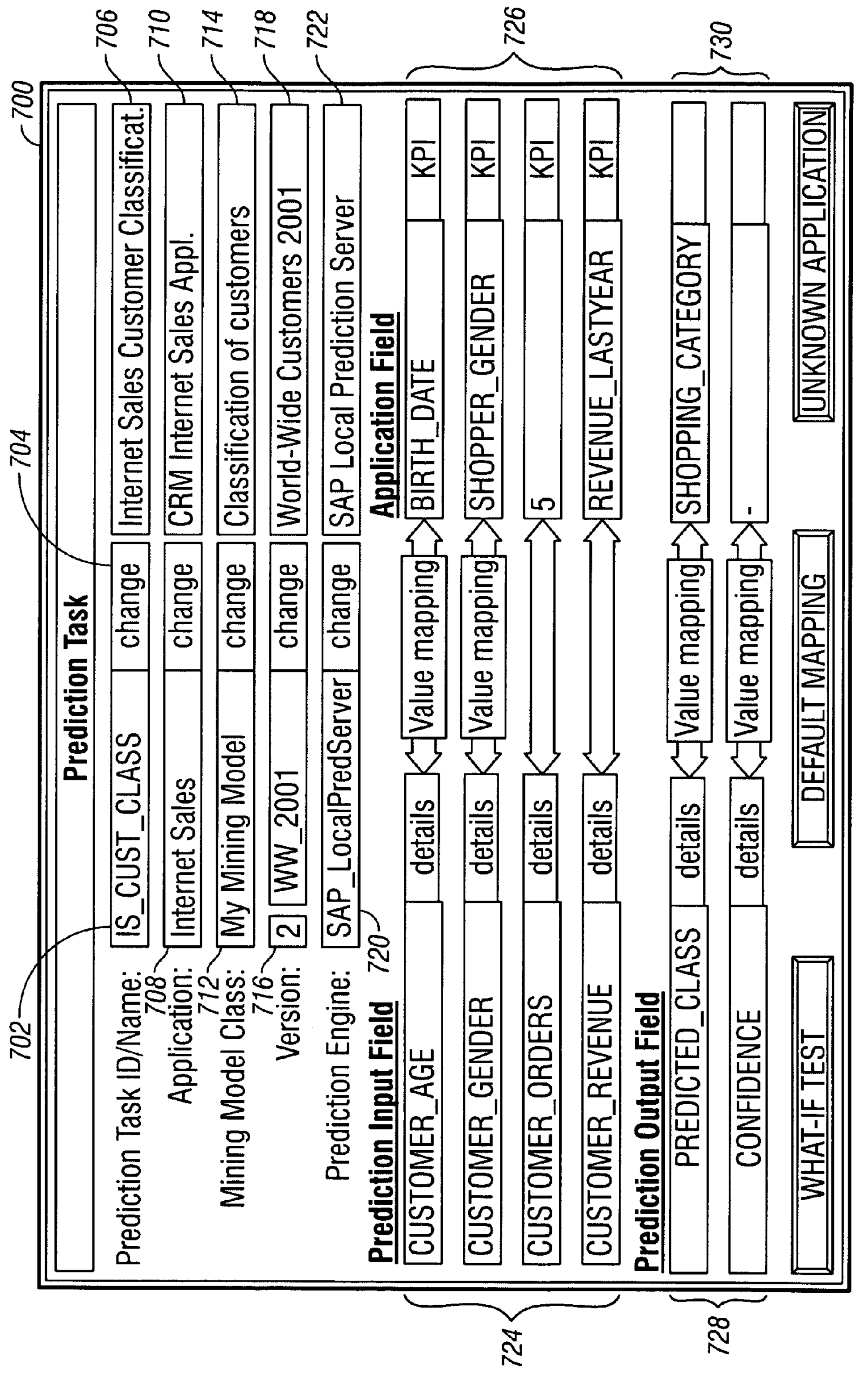
FIG. 7A is a screen display of a prediction task, according to one implementation of the invention.

As noted in FIG. 6A, the class reference field 602 shows the mining model class for the model version. Each model version contains a reference to its base model class. The version identifier field 634 shows the unique version number associated with the model version. The training time field 636 shows the exact time when the model version was trained, or updated, with the new field information. The prediction reference field 610 shows the name of the prediction input field (which refers to the same field name shown for the model class in FIG. 6A), and the data description field 612 shows the high-level description of the field. Lastly, the field description field 640 shows a more detailed description of the field for the model version. In the model version shown in FIG. 6B, the field description field 640 indicates that the mean age of the customers (in the "CUSTOMER_AGE" field) is approximately 35, and only a few customers are younger than 20. In this fashion, the field description field 640 is capable of providing information about a field that is particular to the model version. FIG. 7A is a screen display of a prediction task, according to one implementation of the invention. In this implementation, screen display 700 shows how an administrator, such as AAP administrator in FIG. 2, is able to define a prediction task. A prediction task is an analytical task, in one implementation. A prediction task is initiated by an application, such as an Internet sales application, to obtain predictive output. The prediction task has a format that includes a set of input and output fields. The application initiates the task by sending a request to the AAP using a real-time task interface. The predictive output is then used by the application to initiate subsequent events, such as offering a special promotion to a valued customer. A system, such as AAP 110 shown in FIG. 1A, processes the information contained in the prediction task to help determine the logistics for executing the task. For example, AAP 110 is able to use the information provided in the prediction task to identify the mining model class and prediction engine that are to be used in executing the task. AAP 110 is also able to identify the application and prediction fields that are used for task execution, and the pertinent value mappings between such fields.

In FIG. 7A, screen display 700 shows a page for defining a prediction task. The page contains various fields. An administrator can use these fields to enter, review, and revise the definition of the prediction task. Name field 702 indicates the name (or identifier) of the prediction task. The administrator may select button 704 to change the contents of name field 702. Name description field 706 provides a brief description of the name of the prediction task. Application field 708 indicates the type of application that will be utilizing the prediction task. As shown in the example in FIG. 7A, the application is an Internet sales application. Application description field 710 provides a brief description of the application.

Model class field 712 indicates the name of the mining model class that will be used to implement the predictions. Model class description field 714 provides a brief description of the model class that is used. Version field 716 indicates the version number of the mining model specified in model class field 712. There may be one or more versions of the model, and version field 716 specifies which version will be used by the prediction task. As shown in FIG. 7A, version field 716 indicates that version "2" corresponding to "WW_2001" is to be used. Version description field 718 provides a brief description of the version. Prediction engine field 720 indicates the prediction engine that will be used for generating the predictive output. The prediction task uses the mining model in the prediction engine to generate this output. The prediction engine may be either a local or remote engine. Engine description field 722 provides a brief description of the prediction engine that is used.

Prediction input fields 724 are those set of fields used as input to the prediction process. Typically, the values for these fields are provided by the application, such as an Internet sales application. These input fields provide the mining model with the information that is used to generate predictions. As shown, the input fields are CUSTOMER_AGE, CUSTOMER_GENDER, CUSTOMER_ORDERS, and CUSTOMER_REVENUE. Although the values for these fields are provided by the application, there is not always a direct mapping of the fields that are maintained by the application and those maintained by the mining model. For example, application fields 726 do not have the same field names (or value types, in some cases) as prediction input fields 724. Therefore, in some instances, a mapping function is utilized. This mapping function is included within the scope of the prediction task. To give an example, the value of the application field of BIRTH_DATE is mapped to an age as specified by the CUSTOMER_AGE prediction input field. The prediction task uses the birth date to determine a current age. This type of mapping utilizes a conversion function. The mapping function does not require any conversion in some instances. For example, the application field of SHOPPER_GENDER can be directly mapped to the CUSTOMER_GENDER prediction input field. All of application fields 726 are mapped in some fashion to prediction input fields 724 within the prediction task.

Prediction output fields 728 contain values that are generated as a result of prediction processes. As shown in the example in FIG. 7A, these fields include the PREDICTED_CLASS and CONFIDENCE fields. The value for these fields are sent back to the application as predictive output. However, the application has a separate set of output fields 730 to capture this predictive output. Therefore, the prediction task also has a mapping functionality to map prediction output fields 728 to output fields 730 for the application. Note that the prediction output field of CONFIDENCE has no corresponding output field used by the Internet sales application in the example shown in FIG. 7A.

Application fields 726 include KPI buttons in one implementation of the invention. In this implementation, a prediction task can be combined with a KPI-lookup task. This is done when a KPI is used as an input to the prediction process. Thus, KPI buttons are provided for each application field that is used for prediction input. If an administrator selects this button, a KPI-lookup task is selected for delivering a KPI, and the delivered KPI will be assigned to the model field. This type of assignment creates an automatic invocation of the KPI-lookup task as a prerequisite to the prediction task. As shown in FIG. 7A, the REVENUE_LAST YEAR field will be the result of a KPI-lookup task if the administrator has selected the KPI button located to the right of this field. In this case, the results of the KPI-lookup task will be mapped to the CUSTOMER_REVENUE prediction input field. Any input values required for a given KPI-lookup task are also listed as part of the prediction task as well, according to one implementation. In this implementation, all input values for the KPI-lookup and prediction tasks are grouped together and provided in a unified set of input values.

In one implementation, an application can easily switch between model versions simply by changing the version number, without specifying a new mapping between the application and the model version. If a prediction task gets switched to another version, it inherits the mappings between application fields 726 and prediction input fields 724, and also inherits the mappings between prediction output fields 728 and fields 730. These mappings can be overridden, or changed, to consider the specifics of the model version. For example, if the new model version has fewer fields than the previous model version, then the mappings can be changed accordingly.

Figure 7B:
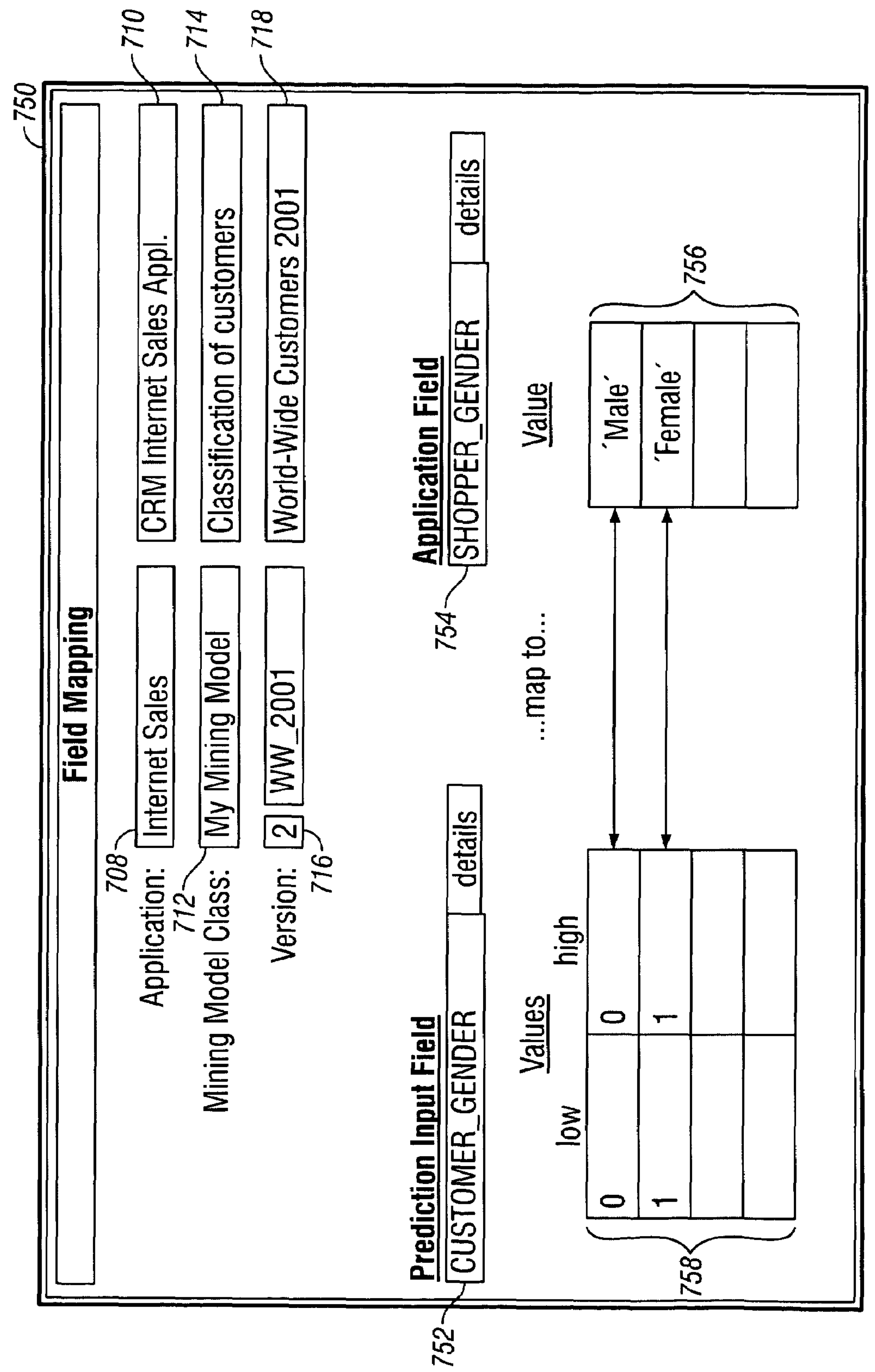
FIG. 7B is a screen display of a field mapping definition according to one implementation of the invention.

FIG. 7B is a screen display of a field mapping definition according to one implementation of the invention. FIG. 7B shows how one of the prediction input fields from set 724 (shown in FIG. 7A) is mapped to one of the application fields from set 726. Screen display 750 shows fields 708, 710, 712, 714, 716, and 718 from FIG. 7A. In addition, FIG. 7B shows a specific prediction input field 752, CUSTOMER_GENDER, and a specific application field 754, SHOPPER_GENDER. As described earlier, input fields such as these may often utilize a mapping function. In the example shown in FIG. 7B, values 756 are mapped to values 758. In this example, 'Male' from values 756 is mapped to '0' in values 758. 'Female' from values 756 is mapped to '1' in values 758. This is just one example of a mapping functionality that may be utilized by the prediction task. For example, other integer, real, enumerated, etc., types may be used for the mapping function.

Figure 7C:
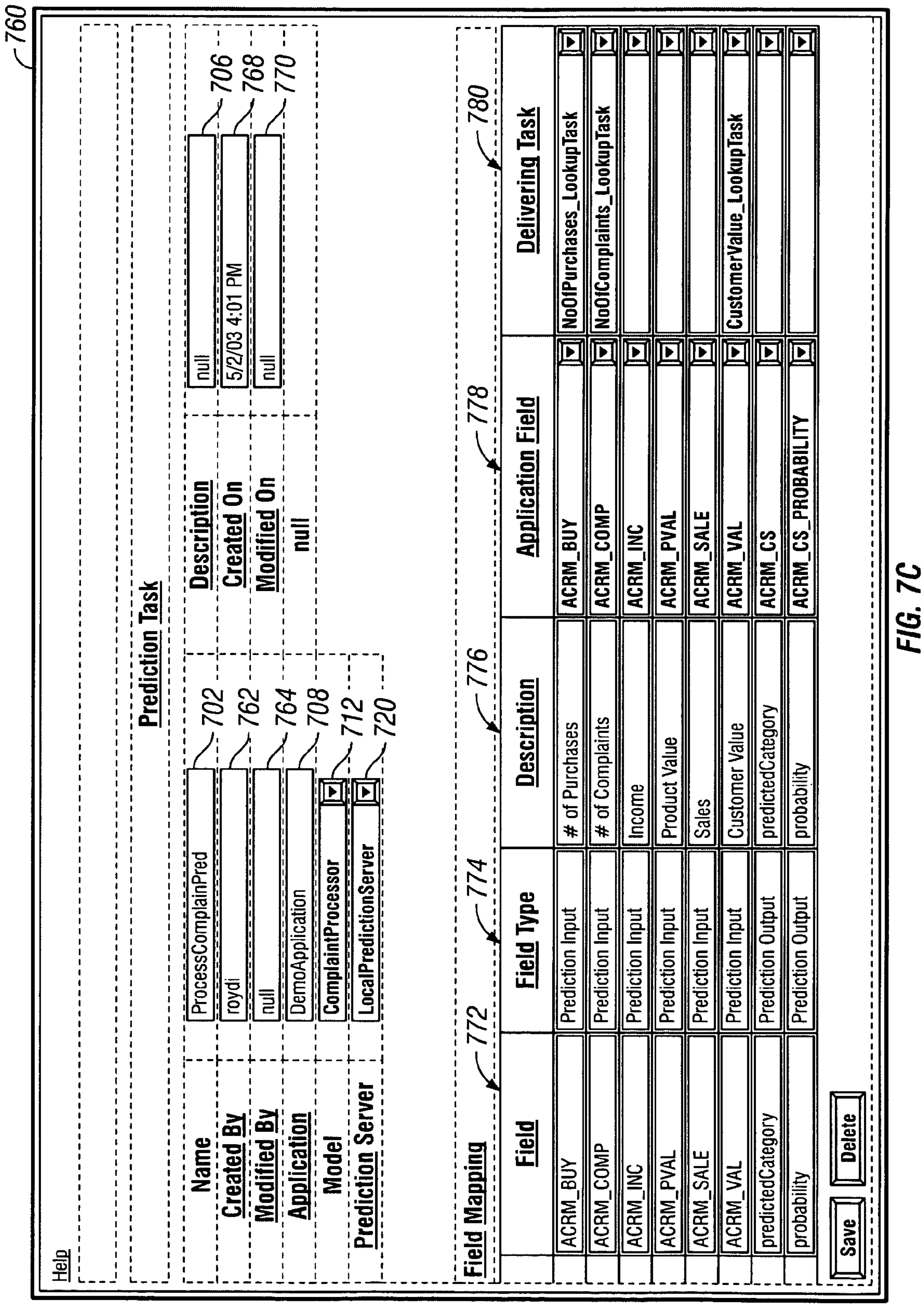
FIG. 7C is a screen display of a prediction task, according to another implementation of the invention.

FIG. 7C is a screen display of a prediction task, according to another implementation of the invention. In this implementation, screen display 760 shows a definition of a prediction task utilized by the AAP, such as AAP 110 shown in FIG. 1A. Fields 702, 706 708, 712, and 720 correspond to the fields shown in FIG. 7A (although the values contained within these fields are different). Fields 768 and 770 indicate when the prediction task was created and/or modified, and fields 762 and 764 indicate who created and/or modified the prediction task.

The mapping between application and prediction task fields is also shown in FIG. 7C. The application fields are shown in column 778. The field type, as indicated in column 774, specifies whether the application field is needed for prediction input or used in providing prediction output back to a front-end software application. The application fields shown in column 778 that are need for prediction input, as indicated in column 774, are mapped to the prediction fields shown in column 772 by the AAP, as specified by the prediction task definition. For example, the AAP would use the prediction task definition shown in FIG. 7C to map the "ACRM_BUY" application field shown in column 778 to the "ACRM_BUY" prediction field shown in column 772, which is a prediction input field. The description for this field, as shown in column 776, is "# of Purchases". Likewise, the "ACRM _VAL" application field can be mapped to the "ACRM_VAL" prediction input field. The description for this field is "Customer Value".

The prediction fields shown in column 772 that are generated as prediction output, as indicated in column 774, are trapped to the application fields shown in column 778 by the AAP, as specified by the prediction task definition. For example, the AAP would use the prediction task definition shown in FIG. 7C to map the "probability" prediction output field shown in column 772 to the "ACRM_CS_PROBABILITY" application field shown in column 778, which is effectively sent back to the front-end software application. The description for this field, as shown in column 776, is "probability".

Task sequencing can be configured using the delivering task fields shown in column 780. If the value shown in a given field for the delivering task is blank, then the corresponding application field, shown in column 778, is to be provided as prediction input by a front-end software application as an input value in a task request sent to the AAP, such as is shown in FIG. 1A. Thus, as shown in FIG. 7C, the "ACRM_INC" application field is to be provided as prediction input by the front-end software application, since the corresponding delivering task field in column 780 is blank. If however, a delivering task field shows the name of a particular task, then this task will first be executed by the AAP to obtain the application field as input to the prediction task. Thus, as shown in FIG. 7C, the "ACRM_BUY" application field is to be provided as prediction input by the "NoOfPurchases_LookupTask". (This task is later shown and described in FIG. 9B.) In this fashion, tasks are effectively chained together. Delivering tasks are capable of providing values for the application fields that are needed as prediction input. As shown in FIG. 7C, three delivering tasks are first executed to provide values for three of the application fields shown in column 778. The prediction task can then be executed by using these values along with the remaining application field values in column 778 that are provided as prediction input by the front-end software application. In one implementation, the AAP can execute multiple delivering tasks in parallel, to gain minimum run time for the chained tasks. In this implementation, the AAP has all of the metadata for task execution, and can therefore decide on the optimal execution orders and parallelism.

Any task that provides the requisite application field shown in column 778 can be selected as a delivering task in column 780. In one implementation, an administrator may utilize a user interface to select, via a pull-down menu, delivering tasks that provide the needed application field values. For example, an administrator could select a delivering task in the appropriate pull-down menu that provides the "ACRM_BUY" application field as output. In the example shown in FIG. 7C, an administrator has selected the "NoOfPurchases_LookupTask". If the administrator does not select any delivering task for the corresponding application fields (such as the fields "ACRM_INC", "ACRM_PVAL", "ACRM_SALE", "ACRM_CS", and "ACRM_CS_PROBABILITY" shown in FIG. 7C), then the front-end software application is to provide the input values for these application fields.

In those situations in which a delivering task provides the information needed by a particular prediction input field, the front-end software application can provide the needed input values for use by the delivering task. For example, the front-end software application can provide the input values needed for execution of the "NoOfPurchases_LookupTask", the "NoOfComplaints_LookupTask", and the "CustomerValue_LookupTask" shown in FIG. 7C. (FIG. 9B shows a definition of the "NoOfpurchases_LookupTask" and indicates the type of information needed by the front-end application.) The front-end application also provides input information for the application fields "ACRM_INC", "ACRM_PVAL", and "ACRM_SALE" that are used directly by the prediction task as prediction input. Thus, when delivering tasks are selected in column 780, the front-end software application, in one implementation, provides a super-set of input values, some of which are used by the delivering tasks, and some of which are used directly by the prediction task. In certain scenarios, there may be an overlap of the input values that are used by the delivering tasks and those used directly by the prediction task.

The delivering tasks selected by an administrator in column 780 could be various different types of tasks, such as KPI-lookup tasks or prediction tasks. By selecting delivering tasks, the AAP, such as AAP 110 shown in FIG. 1A, is capable of chaining analytical tasks together in sequence. The AAP is capable of first invoking the execution of KPI-lookup tasks and then invoking the execution of prediction tasks. In certain implementations, the AAP may also be capable of chaining the execution of KPI-lookup tasks in sequence, or chaining the execution of prediction tasks in sequence.

Figure 8:
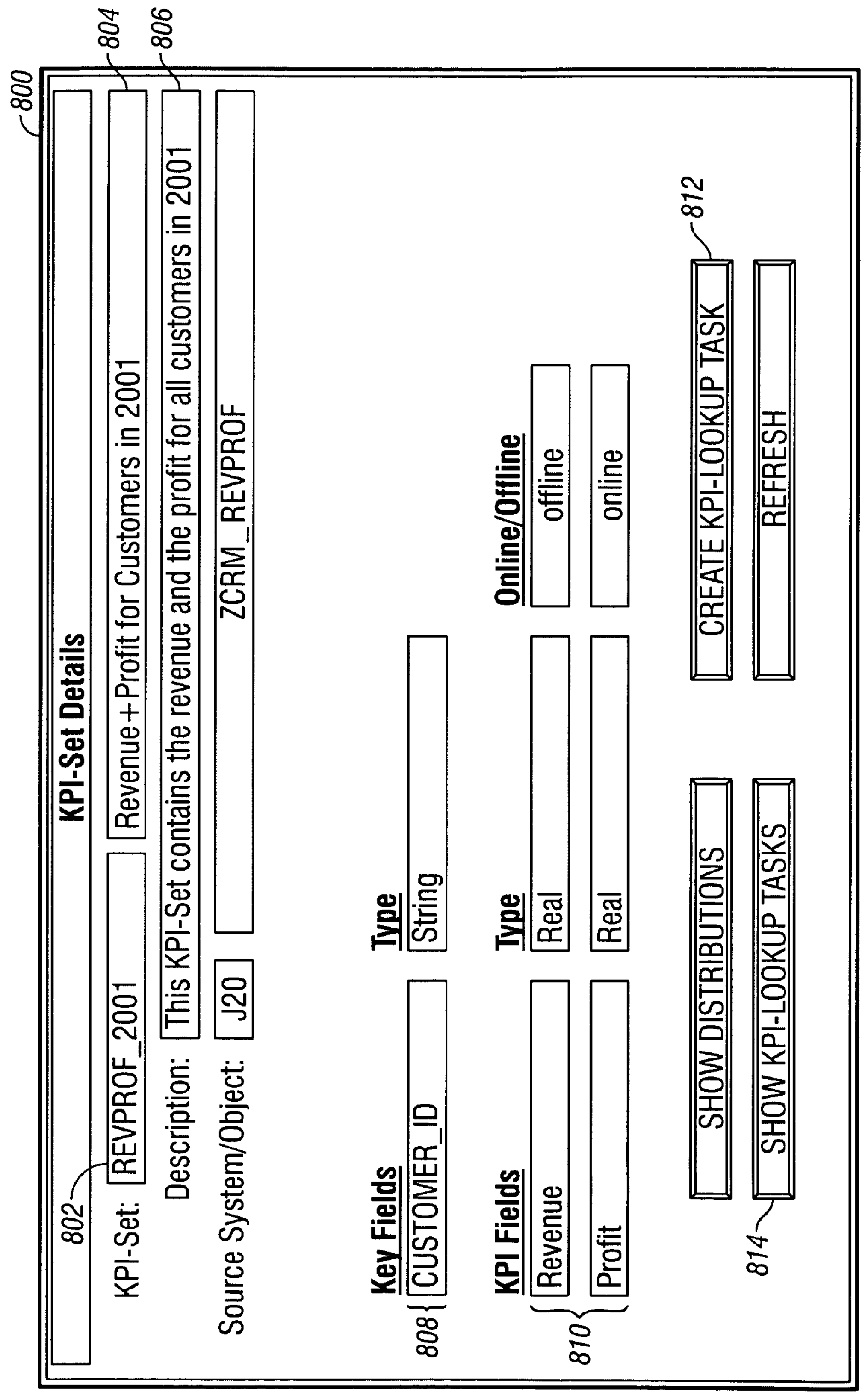
FIG. 8 is a screen display of key performance indicator (KPI) set details, according to one implementation of the invention.

FIG. 8 is a screen display of KPI set details, according to one implementation of the invention. In this implementation, screen display 800 shows the details of a KPI set definition. In one implementation, a creator (such as creator 240 shown in FIG. 2) manages the KPI set definition. In one implementation, the KPI set is stored in data warehouse 124 shown in FIG. 51A. An application is capable of accessing information in the KPI set by way of a KPI-lookup task.

In FIG. 8, screen display 800 contains a page having the details of a KPI set definition. Name field 802 indicates the name of the given KPI set. Name description field 804 provides a brief description of the KPI set. Description field 806 provides an additional description. In the example shown, the KPI set includes revenue and profile information for all customers in the year 2001. Key fields 808 are the key input fields used to access information within the KPI set. Each key field has a name and a type. As shown, the CUSTOMER_ID key field is a string, and is used as input. Each customer has a customer identifier that is designated by the CUSTOMER_ID. KPI fields 810 are then indexed and accessed using the CUSTOMER_ID. The two example KPI fields shown in FIG. 8 are revenue and profit. Each KPI field has a name, type, and online/offline designator. Both the revenue and profile KPI fields have values of type real (i.e., floating point). The online/offline designator indicates whether the KPI field for the KPI set is looked up online, or whether it is kept offline (e.g., in a local cache).

If button 814 is selected, all KPI-lookup tasks associated with the given KPI set will be displayed. If button 812 is selected, a new KPI-lookup task can be created in association with the given KPI set. This new KPI-lookup task would also be associated with the application that initiates the task.

Figure 9A:
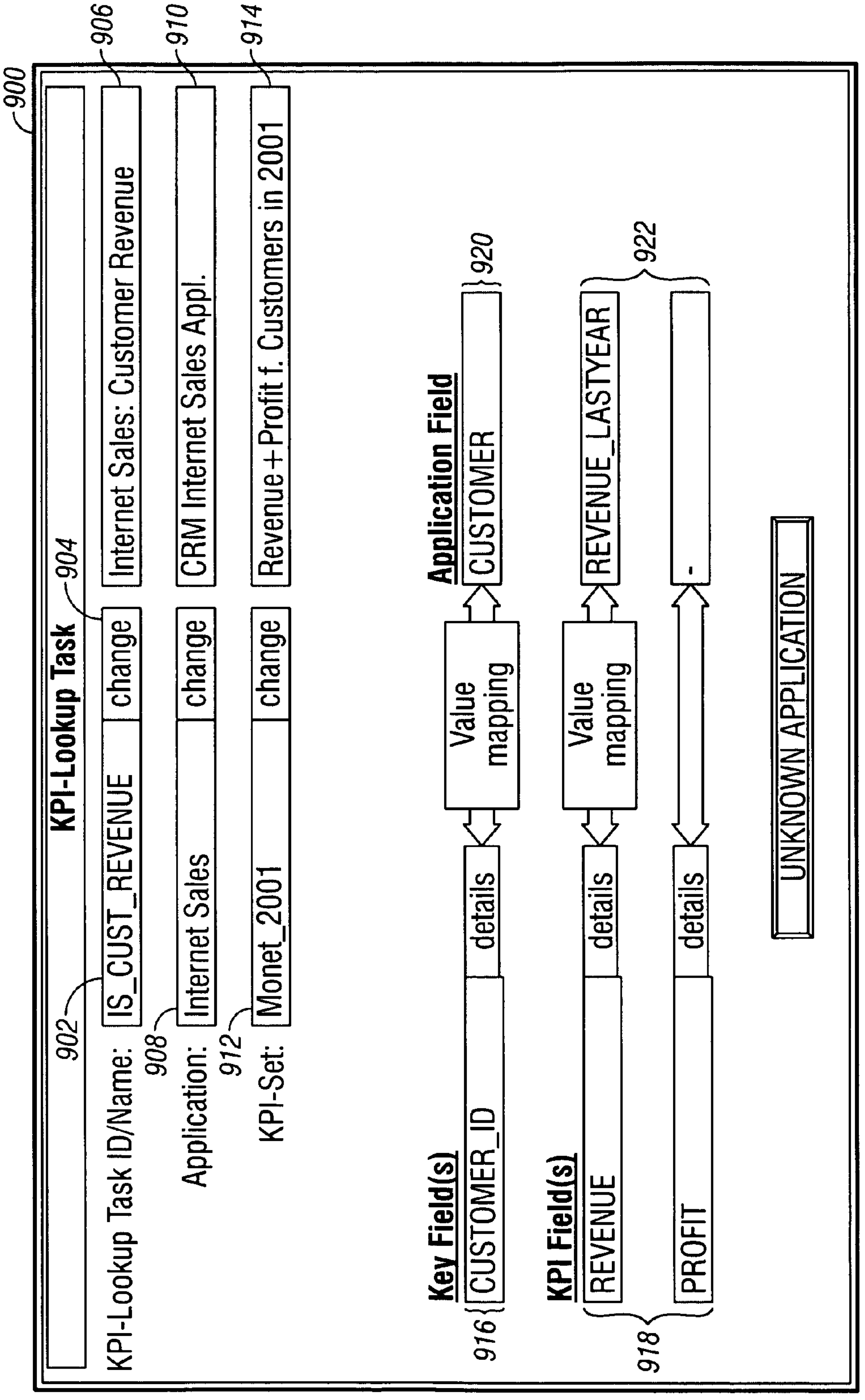
FIG. 9A is a screen display of a KPI-lookup task, according to one implementation of the invention.
Figure 9B:
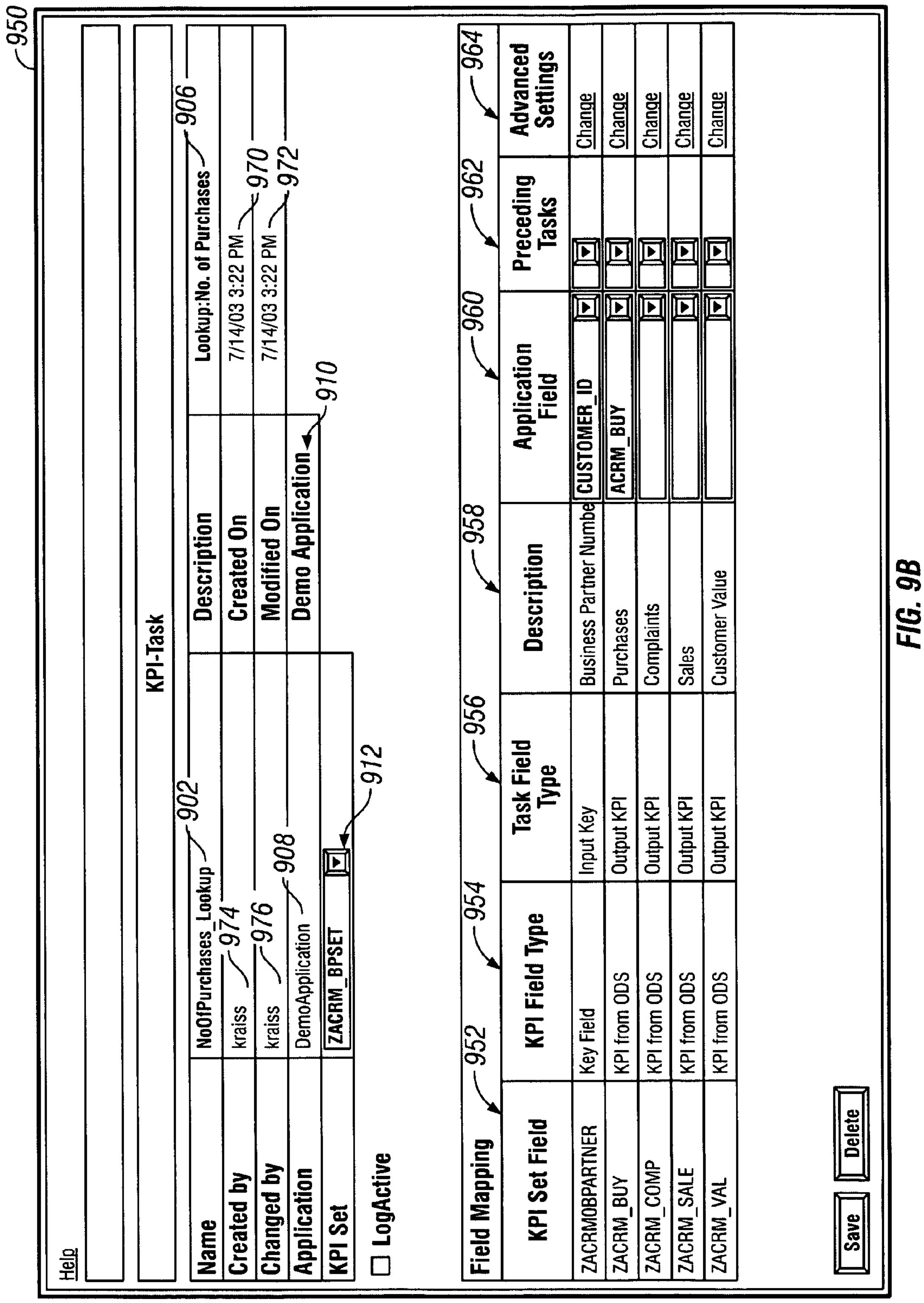
FIG. 9B is a screen display of a KPI-lookup task, according to another implementation of the invention.

FIG. 9A is a screen display of a KPI-lookup task, according to one implementation of the invention. In this implementation, screen display 900 shows a definition of a KPI-lookup task. In one implementation, an administrator, such as AAP administrator 200 in FIG. 2, may define a KPI-lookup task during KPI-lookup task definition 212. An application initiates a KPI-lookup task to obtain KPI set information, which may also be used as input for a prediction task. A system, such as AAP 110 shown in FIG. 1A, processes the information contained in the KPI-lookup task to help determine the logistics for executing the task. For example, AAP 110 is able to use the information provided in the KPI-lookup task to identify the KPI-set that is to be used in executing the task. AAP 110 is also able to identify the application and key fields that are used for task execution, and the pertinent value mappings between such fields.

In FIG. 9A, screen display 900 shows a page for defining a KPI-lookup task. Task name field 902 indicates the name, or identification, of the KPI-lookup task. Button 904 may be selected to change the name of the task. In one implementation, a change button located in proximity to any field may be used to change the value of that field. Name description field 906 provides a brief description of the name of the KPI-lookup task. Application field 908 indicates the name of the application with which the KPI-lookup task is associated. In the example shown in FIG. 9A, the Internet sales application, such as application 100 shown in FIG. 1A, is the associated application. In this example, the Internet sales application would initiate the KPI-lookup task. Application description field 910 provides a brief description of the application. KPI-set field 912 indicates the names of the KPI set that will be used for accessing data in response to the invocation of the KPI-lookup task by the application. The KPI-lookup task will access this KPI set to obtain the KPI information. KPI-set description field 914 provides a brief description of the KPI-set that is used.

Key fields 916 are the input fields used for accessing the KPI-set information as part of the KPI-lookup task. As shown in FIG. 9A, the CUSTOMER_ID is the key field needed to access the KPI information, which is provided as output. To obtain the CUSTOMER_ID key field, the KPI-lookup task first processes the corresponding information from the application in application fields 920. As shown in FIG. 9A, CUSTOMER is the application field that corresponds to the CUSTOMER_ID key field. The KPI-lookup task can use a mapping function to associate these two fields and map one value to another. Similarly, the KPI-lookup task is capable of associating output fields and the values generated from the KPI-lookup task. KPI fields 918 are associated with and mapped to output fields 922. KPI fields 918 (REVENUE, PROFIT) are the KPI-set output fields from the KPI-lookup task. They are obtained by processing the key fields 916 as input. These fields are then mapped to output fields 922, and the values for output fields 922 are then provided to the Internet sales application. Note that the KPI field of PROFIT has no corresponding output field used by the Internet sales application in the example shown in FIG. 9A.

FIG. 9B is a screen display of a KPI-lookup task, according to another implementation of the invention. In this implementation, the screen display 950 shows a definition of a KPI-lookup task having fields 902, 906, 908, 910, and 912 that correspond to the fields shown in FIG. 9A (although the values contained within these fields are different). The "NoOfPurchases_Lookup" task, as defined in FIG. 9B, corresponds to one of the delivering tasks shown in column 780 of FIG. 7C. The application field "ACRM_BUY", shown in column 960, is provided as prediction input value "ACRM_BUY" to the prediction task defined in FIG. 7C.

The screen display 950 contains various additional fields. Fields 970 and 972 indicate when the KPI-lookup task defined in FIG. 9B was created and/or modified. Fields 974 and 976 indicate who created and/or changed the KPI-lookup task. The fields and field mappings implemented by the KPI-lookup task are shown in columns 952, 954, 956, 958, 960, 962, and 964. Column 952 shows all of the KPI set fields for the KPI-lookup task. These fields include input and output fields. Columns 954 and 956 show the KPI field types and the task field types, respectively. When the task field type is set to "Input Key", the task field is used as input to the KPI-lookup task. When the task field type is set to "Output KPI", the task field corresponds to the output generated upon execution of the KPI-lookup task. Column 958 shows the descriptions of the various fields.

Column 960 shows the application field settings. These settings correspond to the field values used in the interface to the KPI-lookup task. In one implementation, a front-end software application, such as front-end software application 100 shown in FIG. 1A, provides the values for the application fields needed as input to the KPI-lookup task. For example, in FIG. 9B, the "CUSTOMER_ID" application field is an input key field that can be directly provided by the front-end software application. In one implementation, the application fields that contain output KPI information are provided as input to other analytical tasks for subsequent execution. For example, the "ACRM_BUY" application field containing output KPI information may be provided as input into a prediction task, such as the task defined in FIG. 7C. In this implementation, the KPI-lookup task serves as a delivering task for one or more values used as input by the prediction task. In another implementation, the "ACRM_BUY" application field is provided directly back to the front-end software application for processing.

Column 962 shows preceding tasks. Preceding tasks are similar in concept to the delivering tasks shown in column 780 in FIG. 7C. The value of any of the input fields can be provided by either the application or by a preceding task. There is no limit on the deepness of chaining. The AAP only checks on cycles during design time. That is, if a first task needs input from a second task, and if an administrator wants to specify that the second task needs input from the first task, the specification will be rejected, due to the non-executable cyclic dependency between the first and second tasks.

Column 964 shows advanced settings. Using the advanced settings, the administrator can specify the value mapping between application fields and KPI-set fields. Each task can have its own specification as to which application field values are mandatory, and its own value mapping between application fields and KPI-set fields.

In certain implementations, computer-readable media are provided to the AAP for use in performing various of the methods of operation described above. These computer-readable media contain computer-executable instructions for performing these methods of operation.

A number of implementations of the invention have been described. Nevertheless, it will be understood that various modifications may be made without departing from the spirit and scope of the invention. Accordingly, other embodiments are within the scope of the following claims.

What is claimed is:

1. A computer system for accessing computer-readable medium including computer-executable instructions to process task requests from front-end software applications, the computer-executable instructions when executed by a processor perform the steps of:

receiving a task request from a front-end software application, the task request including input values and a task name that is associated with a first prediction task to be executed;

using a first task definition for the first prediction task and the task request to select a first prediction engine to be used for execution of the first prediction task using the first task definition and the task request to select a first subset of the input values needed for execution of the first prediction task;

translating the selected first subset of the input values into formats usable by the selected first prediction engine;

creating a first task invocation request that includes the translated input values;

sending the first task invocation request to the selected first prediction engine;

receiving output task information generated upon execution of the first prediction task;

using a second task definition for a second analytical task and the task request to select a second analytical engine to be used for execution of a second analytical task of a particular type, the second analytical engine being different from the first prediction engine;

using the second task definition and the task request to select a second subset of the input values needed for execution of the second analytical task of the particular type;

creating a second task invocation request that includes the second subset of the input values and the output task information generated upon execution of the first prediction task; and sending the second task invocation request to the second analytical engine.

2. The computer system of claim 1, wherein the subset of the input values needed for execution of the first prediction task includes at least one of the input values.

3. The computer system of claim 1, wherein computer-executable instructions when executed by a processor further perform the steps of:

receiving from the first prediction engine output values generated from execution of the first prediction task; and sending the output values to the front-end software application.

4. The computer system of claim 3, wherein the computer-executable instructions when executed by a processor further perform the step of translating the output values into formats usable by the front-end software application.

5. The computer system of claim 1, wherein the first prediction engine is external to the computer system.

6. The computer system of claim 1, wherein the front-end software application is external to the computer system.

7. A computer-implemented method for processing task requests from front-end software applications, the method comprising:

receiving a task request from a front-end software application, the task request including input values and a task name that is associated with a key performance indicator (KPI) lookup task to be executed;

using a first task definition for the KPI lookup task and the task request to select a KPI engine to be used for execution of the KPI lookup task;

using the first task definition and the task request to select a first subset of the input values needed for execution of the KPI lookup task;

translating the selected first subset of the input values into formats usable by the selected KPI engine;

creating a first task invocation request that includes the translated input values;

sending the first task invocation request to the selected KPI engine;

receiving output task information generated upon execution of the first KPI lookup task;

using a second task definition for a second analytical task and the task request to select a second analytical engine to be used for execution of a second analytical task of a particular type, the second analytical engine being different from the first KPI engine;

using the task definition and the task request to select a second subset of the input values needed for execution of the second analytical task of the particular type;

creating a second task invocation request that includes the second subset of the input values and the output task information generated upon execution of the first KPI lookup task; and sending the second task invocation request to the second analytical engine.

8. The computer-implemented method of claim 7, wherein the subset of the input values needed for execution of the first KPI lookup task includes at least one of the input values.

9. The computer-implemented method of claim 7, wherein the method comprises:

receiving from the first KPI engine output values generated from execution of the first KPI lookup task; and sending the output values to the front-end software application.

10. The computer-implemented method of claim 9, wherein the method comprises translating the output values into formats usable by the front-end software application.

11. The computer-implemented method of claim 7, wherein the first KPI engine is external to the computer system.

12. The computer-implemented method of claim 7, wherein the front-end software application is external to the computer system.

13. A computer-readable medium having computer-executable instructions contained therein for performing a method, the method comprising:

receiving a task request from a front-end software application, the task request including input values and a task name that is associated with a first prediction task to be executed;

using a first task definition for the first prediction task and the task request to select a first prediction engine to be used for execution of the first prediction task;

using the first task definition and the task request to select a first subset of the input values needed for execution of the first prediction task;

translating the selected first subset of the input values into formats usable by the selected prediction engine;

creating a first task invocation request that includes the translated input values;

sending the first task invocation request to the selected first prediction engine;

receiving output task information generated upon execution of the first prediction task;

using a second task definition for a second analytical task and the task request to select a second analytical engine to be used for execution of the second analytical task of the particular type, the second analytical engine being different from the first prediction engine;

using the second task definition and the task request to select a second subset of the input values needed for execution of the second analytical task of the particular type;

creating a second task invocation readiest that includes the second subset of the input values and the output task information generated upon execution of the first prediction task; and sending the second task invocation request to the second analytical engine.

* * * * *